US011734359B2

(12) United States Patent
Hearst et al.

(10) Patent No.: US 11,734,359 B2
(45) Date of Patent: *Aug. 22, 2023

(54) HANDLING VAGUE MODIFIERS IN NATURAL LANGUAGE COMMANDS

(71) Applicant: Tableau Software, Inc., Seattle, WA (US)

(72) Inventors: Marti Hearst, Berkeley, CA (US); Melanie K. Tory, Portland, ME (US); Vidya Raghavan Setlur, Portola Valley, CA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,429

(22) Filed: Jul. 28, 2022

(65) Prior Publication Data

US 2022/0365970 A1 Nov. 17, 2022

Related U.S. Application Data

(63) Continuation of application No. 17/347,453, filed on Jun. 14, 2021, now Pat. No. 11,416,559, which is a
(Continued)

(51) Int. Cl.
*G06F 17/00* (2019.01)
*G06F 16/904* (2019.01)
(Continued)

(52) U.S. Cl.
CPC .......... *G06F 16/904* (2019.01); *G06F 16/243* (2019.01); *G06F 16/248* (2019.01);
(Continued)

(58) Field of Classification Search
CPC .... G06F 16/904; G06F 16/243; G06F 16/248; G06F 16/26; G06F 16/287;
(Continued)

(56) References Cited

U.S. PATENT DOCUMENTS

| 4,800,810 A | 1/1989 | Masumoto |
| 5,036,314 A | 7/1991 | Barillari et al. |

(Continued)

FOREIGN PATENT DOCUMENTS

| HU | 215657 B | 1/1994 |
| WO | WO 2006/060773 A2 | 6/2006 |

OTHER PUBLICATIONS

Felix, Cristian, et al, "TextTile: An Interactive Visualization Tool for Seamless Exploratory Analysis of Structured Data and Unstructured Text", IEEE Transactions on Visualization and Computer Graphics (vol. 23, Issue 1), pp. 161-170, Jan. 1, 2017 (Year: 2017).*

(Continued)

*Primary Examiner* — Laurie A Ries
(74) *Attorney, Agent, or Firm* — Morgan, Lewis & Bockius LLP

(57) ABSTRACT

A computing device receives a user input to specify a natural language command directed to a data source. The device identifies a first keyword, corresponding to a first data field from the data source, in the natural language command. The device identifies a second keyword in the natural language command. The second keyword comprises an adjective that provides context for the first data field. The device generates a visual specification based on the first and second keywords. The visual specification specifies the data source, a plurality of visual variables, and a plurality of data fields from the data source, including the first data field. The visual variables include a first visual variable that specifies filtering of the first data field according to the second keyword. The device generates and displays a data visualization based on the visual specification.

20 Claims, 15 Drawing Sheets

Related U.S. Application Data continuation of application No. 16/601,413, filed on Oct. 14, 2019, now Pat. No. 11,042,558.

(60) Provisional application No. 62/897,187, filed on Sep. 6, 2019.

(51) Int. Cl.

| | | |
|---|---|---|
| *G06F 40/30* | (2020.01) | |
| *G06N 5/04* | (2023.01) | |
| *G06F 40/253* | (2020.01) | |
| *G06F 40/211* | (2020.01) | |
| *G06F 16/242* | (2019.01) | |
| *G06F 16/28* | (2019.01) | |
| *G06F 16/26* | (2019.01) | |
| *G06F 16/248* | (2019.01) | |
| *G06F 40/279* | (2020.01) | |
| *G06F 16/9038* | (2019.01) | |
| *G06F 16/9032* | (2019.01) | |

(52) U.S. Cl.
CPC ............ *G06F 16/26* (2019.01); *G06F 16/287* (2019.01); *G06F 16/9038* (2019.01); *G06F 16/90332* (2019.01); *G06F 40/211* (2020.01); *G06F 40/253* (2020.01); *G06F 40/279* (2020.01); *G06F 40/30* (2020.01); *G06N 5/04* (2013.01)

(58) Field of Classification Search
CPC ........... G06F 16/90332; G06F 16/9038; G06F 40/211; G06F 40/253; G06F 40/30; G06F 40/247; G06F 40/284; G06F 40/18; G06N 5/04

See application file for complete search history.

(56) References Cited

U.S. PATENT DOCUMENTS

| | | |
|---|---|---|
| 5,060,980 A | 10/1991 | Johnson et al. |
| 5,144,452 A | 9/1992 | Abuyama |
| 5,169,713 A | 12/1992 | Kumurdjian |
| 5,265,244 A | 11/1993 | Ghosh et al. |
| 5,265,246 A | 11/1993 | Li et al. |
| 5,377,348 A | 12/1994 | Lau et al. |
| 5,383,029 A | 1/1995 | Kojima |
| 5,560,007 A | 9/1996 | Thai |
| 5,577,241 A | 11/1996 | Spencer |
| 5,581,677 A | 12/1996 | Myers et al. |
| 5,664,172 A | 9/1997 | Antoshenkov |
| 5,664,182 A | 9/1997 | Nierenberg et al. |
| 5,668,987 A | 9/1997 | Schneider |
| 5,794,246 A | 8/1998 | Sankaran et al. |
| 5,864,856 A | 1/1999 | Young |
| 5,893,088 A | 4/1999 | Hendricks et al. |
| 5,913,205 A | 6/1999 | Jain et al. |
| 5,933,830 A | 8/1999 | Williams |
| 6,031,632 A | 2/2000 | Yoshihara et al. |
| 6,032,158 A | 2/2000 | Mukhopadhyay et al. |
| 6,044,374 A | 3/2000 | Nesamoney et al. |
| 6,100,901 A | 8/2000 | Mohda et al. |
| 6,115,744 A | 9/2000 | Robins et al. |
| 6,154,766 A | 11/2000 | Yost et al. |
| 6,173,310 B1 | 1/2001 | Yost et al. |
| 6,188,403 B1 | 2/2001 | Sacerdoti et al. |
| 6,208,990 B1 | 3/2001 | Suresh et al. |
| 6,222,540 B1 | 4/2001 | Sacerdoti et al. |
| 6,247,008 B1 | 6/2001 | Cambot et al. |
| 6,253,257 B1 | 6/2001 | Dundon |
| 6,260,050 B1 | 7/2001 | Yost et al. |
| 6,269,393 B1 | 7/2001 | Yost et al. |
| 6,300,957 B1 | 10/2001 | Rao et al. |
| 6,301,579 B1 | 10/2001 | Becker |
| 6,317,750 B1 | 11/2001 | Tortolani et al. |
| 6,327,628 B1 | 12/2001 | Anuff et al. |
| 6,339,775 B1 | 1/2002 | Zamanian et al. |
| 6,377,259 B2 | 4/2002 | Tenev et al. |
| 6,397,195 B1 | 5/2002 | Pinard et al. |
| 6,400,366 B1 | 6/2002 | Davies et al. |
| 6,405,195 B1 | 6/2002 | Ahlberg |
| 6,405,208 B1 | 6/2002 | Raghavan et al. |
| 6,424,933 B1 | 7/2002 | Agrawala et al. |
| 6,490,593 B2 | 12/2002 | Proctor |
| 6,492,989 B1 | 12/2002 | Wilkinson |
| 6,522,342 B1 | 2/2003 | Gagnon et al. |
| 6,611,825 B1 | 8/2003 | Billheimer et al. |
| 6,643,646 B2 | 11/2003 | Su et al. |
| 6,707,454 B1 | 3/2004 | Barg et al. |
| 6,714,897 B2 | 3/2004 | Whitney et al. |
| 6,725,230 B2 | 4/2004 | Ruth et al. |
| 6,750,864 B1 | 6/2004 | Anwar |
| 6,768,986 B2 | 7/2004 | Cras et al. |
| 6,906,717 B2 | 6/2005 | Couckuyt et al. |
| 7,009,609 B2 | 3/2006 | Miyadai |
| 7,023,453 B2 | 4/2006 | Wilkinson |
| 7,089,266 B2 | 8/2006 | Stolte et al. |
| 7,117,058 B2 | 10/2006 | Lin et al. |
| 7,176,924 B2 | 2/2007 | Wilkinson |
| 7,290,007 B2 | 10/2007 | Farber et al. |
| 7,302,383 B2 | 11/2007 | Valles |
| 7,315,305 B2 | 1/2008 | Crotty et al. |
| 7,379,601 B2 | 5/2008 | Yang et al. |
| 7,426,520 B2 | 9/2008 | Gorelik et al. |
| 7,603,267 B2 | 10/2009 | Wang et al. |
| 7,716,173 B2 | 5/2010 | Stolte et al. |
| 7,882,144 B1 | 2/2011 | Stolte et al. |
| 8,082,243 B2 | 12/2011 | Gorelik et al. |
| 8,140,586 B2 | 3/2012 | Stolte et al. |
| 8,442,999 B2 | 5/2013 | Gorelik et al. |
| 8,473,521 B2 | 6/2013 | Fot et al. |
| 8,620,937 B2 | 12/2013 | Jonas |
| 8,713,072 B2 | 4/2014 | Stotle et al. |
| 8,751,505 B2 | 6/2014 | Carmel et al. |
| 8,874,613 B2 | 10/2014 | Gorelik et al. |
| 8,972,457 B2 | 3/2015 | Stolte et al. |
| 9,183,235 B2 | 11/2015 | Stolte et al. |
| 9,299,173 B2 | 3/2016 | Rope et al. |
| 9,336,253 B2 | 5/2016 | Gorelik et al. |
| 9,501,585 B1 | 11/2016 | Gautam et al. |
| 9,633,091 B2 | 4/2017 | Stolte et al. |
| 9,665,662 B1 | 5/2017 | Gautam |
| 9,672,497 B1 | 6/2017 | Lewis et al. |
| 9,818,211 B1 | 11/2017 | Gibb et al. |
| 9,858,292 B1 | 1/2018 | Setlur et al. |
| 9,947,314 B2 | 4/2018 | Cao et al. |
| 9,983,849 B2 | 4/2018 | Weingartner |
| 10,042,517 B2 | 8/2018 | Stolte et al. |
| 10,042,901 B2 | 8/2018 | Stolte et al. |
| 10,331,720 B2 | 6/2019 | Neels et al. |
| 10,409,551 B1 | 9/2019 | Waugh |
| 10,418,032 B1 | 9/2019 | Mohajer et al. |
| 10,515,121 B1 | 12/2019 | Setlur et al. |
| 10,546,003 B2 | 1/2020 | Gupta et al. |
| 10,564,622 B1 | 2/2020 | Dean et al. |
| 10,817,527 B1 | 10/2020 | Setlur et al. |
| 10,956,655 B2 | 3/2021 | Choe |
| 11,055,489 B2* | 7/2021 | Djalali ................. G06F 16/904 |
| 11,080,336 B2 | 8/2021 | van Dusen |
| 11,114,189 B2 | 9/2021 | Prosky et al. |
| 11,455,339 B1* | 9/2022 | Ericson ................. G06F 40/247 |
| 2001/0013036 A1 | 8/2001 | Judicibus |
| 2002/0002325 A1 | 1/2002 | Lliff |
| 2002/0059204 A1 | 5/2002 | Harris |
| 2002/0118192 A1 | 8/2002 | Couckuyt et al. |
| 2002/0123865 A1 | 9/2002 | Whitney et al. |
| 2002/0135610 A1 | 9/2002 | Ootani et al. |
| 2002/0154118 A1 | 10/2002 | McCarthy et al. |
| 2003/0200034 A1 | 10/2003 | Fellenberg et al. |
| 2004/0148170 A1 | 7/2004 | Acero et al. |
| 2004/0183800 A1 | 9/2004 | Peterson |
| 2004/0227759 A1 | 11/2004 | McKnight et al. |
| 2004/0243593 A1 | 12/2004 | Stolte et al. |
| 2005/0035966 A1 | 2/2005 | Pasquarette et al. |

(56) References Cited

U.S. PATENT DOCUMENTS

| | | |
|---|---|---|
| 2005/0035967 A1 | 2/2005 | Joffrain et al. |
| 2005/0060300 A1 | 3/2005 | Stolte et al. |
| 2005/0099423 A1 | 5/2005 | Brauss |
| 2006/0129913 A1 | 6/2006 | Vigesaa et al. |
| 2006/0136825 A1 | 6/2006 | Cory et al. |
| 2006/0206512 A1 | 9/2006 | Hanrahan et al. |
| 2007/0061344 A1 | 3/2007 | Dickerman et al. |
| 2007/0061611 A1 | 3/2007 | MacKinlay et al. |
| 2007/0129936 A1 | 6/2007 | Wang et al. |
| 2008/0016026 A1 | 1/2008 | Farber et al. |
| 2009/0313576 A1 | 12/2009 | Neumann et al. |
| 2011/0112837 A1 | 5/2011 | Kurki-Sounio et al. |
| 2011/0119047 A1 | 5/2011 | Ylonen |
| 2011/0184718 A1 | 7/2011 | Chen |
| 2012/0323948 A1 | 12/2012 | Li et al. |
| 2013/0249917 A1 | 9/2013 | Fanning et al. |
| 2014/0164362 A1 | 6/2014 | Syed et al. |
| 2014/0236579 A1 | 8/2014 | Kurz |
| 2016/0078354 A1 | 3/2016 | Petri et al. |
| 2016/0092090 A1 | 3/2016 | Stojanovic et al. |
| 2016/0179908 A1 | 6/2016 | Johnston et al. |
| 2017/0091277 A1 | 3/2017 | Zoch |
| 2017/0091902 A1 | 3/2017 | Bostick et al. |
| 2017/0118308 A1 | 4/2017 | Vigeant et al. |
| 2017/0154089 A1 | 6/2017 | Sherman |
| 2017/0308571 A1 | 10/2017 | McCurley et al. |
| 2018/0032576 A1 | 2/2018 | Romero |
| 2018/0033203 A1 | 2/2018 | Ligameri et al. |
| 2018/0039614 A1 | 2/2018 | Govindarajulu et al. |
| 2018/0144065 A1 | 5/2018 | Yellai |
| 2018/0158245 A1 | 6/2018 | Govindan |
| 2018/0203924 A1 | 7/2018 | Agrawal et al. |
| 2018/0210883 A1 | 7/2018 | Ang |
| 2018/0329987 A1 | 11/2018 | Tata et al. |
| 2019/0026318 A1 | 1/2019 | Bertellotti et al. |
| 2019/0042634 A1 | 2/2019 | Stolte et al. |
| 2019/0102390 A1 | 4/2019 | Antunes et al. |
| 2019/0108171 A1 | 4/2019 | Stolte et al. |
| 2019/0115016 A1 | 4/2019 | Seok et al. |
| 2019/0120649 A1 | 4/2019 | Seok et al. |
| 2019/0121801 A1 | 4/2019 | Jethwa et al. |
| 2019/0138648 A1 | 5/2019 | Gupta et al. |
| 2019/0163807 A1 | 5/2019 | Jain et al. |
| 2019/0179607 A1 | 6/2019 | Thangarathnam et al. |
| 2019/0197605 A1 | 6/2019 | Sadler et al. |
| 2019/0236144 A1 | 8/2019 | Hou et al. |
| 2019/0272296 A1 | 9/2019 | Prakash et al. |
| 2019/0311717 A1 | 10/2019 | Kim et al. |
| 2019/0349321 A1 | 11/2019 | Cai et al. |
| 2019/0384815 A1 | 12/2019 | Patel et al. |
| 2020/0065385 A1 | 2/2020 | Dreher et al. |
| 2020/0089700 A1 | 3/2020 | Ericson et al. |
| 2020/0089760 A1 | 3/2020 | Ericson et al. |
| 2020/0090189 A1 | 3/2020 | Tutuk et al. |
| 2020/0104402 A1 | 4/2020 | Burnett et al. |
| 2020/0110803 A1 | 4/2020 | Djalali et al. |
| 2020/0134103 A1 | 4/2020 | Mankovskii |
| 2020/0327432 A1 | 10/2020 | Doebelin et al. |
| 2021/0073279 A1* | 3/2021 | Leite Goldner ...... G06F 40/279 |

OTHER PUBLICATIONS

Becker, Trellis Graphics Displays: A Multi-dimensional Data Visualization Tool for Data Mining, Aug. 1997, 13 pgs.
Becker, Visualizing Decision Table Classifiers, 1998, 4 pgs.
Beers, Office Action, U.S. Appl. No. 11/787,761, dated Jun. 12, 2008, 12 pgs.
Beers, Office Action, U.S. Appl. No. 11/787,761, dated Dec. 17, 2008, 13 pgs.
Bosch, Performance Analysis and Visualization of Parallel Systems Using SimOS and Rivet: A Case Study, Jan. 2000, 13 pgs.
Bosch, Rivet: A Flexible Environment for Computer Systems Visualization, Feb. 2000, 9 pgs.
Brunk, MineSet: An Integrated System for Data Mining, 1997, 4 pgs.
D. Brookshire Conner et al., "Three-Dimensional Widgets," 1992 ACM, pp. 183-231, (Year: 1992).
Derthick, An Interactive Visual Query Environment for Exploring Data, 1997, 11 pgs.
Freeze, Unlocking OLAP with Microsoft SQL Server and Excel 2000, 2000, 220 pgs.
Fua, "Hierarchical Parallel Coordinates for Exploration of Large Datasets," IEEE 1999, pp. 43-50 (Year: 1999).
Eser Kandogan, "Star Coordinates: A Multi-dimensional Visualization Technique with Uniform Treatment of Dimensions," www.citeseerx.st.psu.edu, pp. 1-4, 2000 (YearL 2000).
Fua, Navigating Hierarchies with Structure-Based Brushes, 1999, 7 pgs.
Gao, Tong, et al. "Datatone: Managing ambiguity in natural language interfaces for data visualization." Proceedings of the 28th Annual ACM Symposium on User Interface Software & Technology, Nov. 2015, pp. 489-500, (Year: 2015).
Goldstein, A Framework for Knowledge-Based Interactive Data Exploration, Dec. 1994, 30 pgs.
Gray, Data Cube: A Relational Aggregation Operator Generalizing Group-By, 1997, 24 pgs.
Hanrahan, Office Action, U.S. Appl. No. 11/005,652, dated Feb. 20, 2009, 11 pgs.
Hanrahan, Office Action, U.S. Appl. No. 11/005,652, dated Jul. 24, 2008, 11 pgs.
Hanrahan, Office Action, U.S. Appl. No. 11/005,652, dated Dec. 27, 2007, 11 pgs.
Hanrahan, Specification, U.S. Appl. No. 11/005,652, dated Dec. 2, 2004, 104 pgs.
Harri Siirtola, "Direct Manipulation of Parallel Coordinates," 2000 IEEE, pp. 373-378, (Year: 2000).
Healey, On the Use of Perceptual Cues and Data Mining for Effective Visualization of Scientific Datasets, 1998, 8 pgs.
Hearst, Office Action, U.S. Appl. No. 16/601,413, dated Nov. 3, 2020, 17 pgs.
Hearst, Notice of Allowance, U.S. Appl. No. 16/601,413, dated Mar. 3, 2021, 10 pgs.
Hearst, Notice of Allowance, U.S. Appl. No. 17/347,453, dated Apr. 6, 2022, 11 pgs.
Hing-Yan Lee et al., "A Multi-Dimensional Data Visualization Tool for Knowledge Discovery in Databases," 1995 IEEE, pp. 26-31, (Year: 1995).
HU Search Report, HU P0700460, dated Oct. 9, 2007, 1 pg.
John V. Carlis and Joseph A. Konstan, Interactive Visualization of Serial Periodic Data, www.Courses.ischool.berkeley.edu, pp. 1-10, 1998 (Year: 1998).
Joseph, Office Action, U.S. Appl. No. 13/734,694, dated Aug. 18, 2014, 46 pgs.
Keim, VisDB: Database Exploration Using Multidimensional Visualization, Aug. 1994, 27 pgs.
Kohavi, Data Mining and Visualization, 2000, 8 pgs.
Livay, DEVise: Integrated Querying and Visual Exploration of Large Datasets, May 1997, 12 pgs.
Livney, M. et al., "DEVise: Integrated Querying and Visual Exploration of Large Datasets," ACM, 1997, pp. 301-312, (Year: 1997).
MacDonald, Creating Basic Charts, 2006, 46 pgs.
MacKinlay, Automating the Design of Graphical Presentations of Relational Information, 1986, 34 pgs.
MacKinlay, Office Action, U.S. Appl. No. 11/223,658, dated May 21, 2008, 20 pgs.
MacKinlay, Office Action, U.S. Appl. No. 11/223,658, dated Feb. 23, 2009, 19 pgs.
MacKinlay, Specification, U.S. Appl. No. 11/223,658, dated Sep. 9, 2005, 58 pgs.
Matsushita, Mitsunori, Eisaku Maeda, and Tsuneaki Kato. "An interactive visualization method of numerical data based on natural language requirements." International journal of human-computer studies 60.4, Apr. 2004, pp. 469-488. (Year: 2004).
Perlin, An Alternative Approach to the Computer Interface, 1993, 11 pgs.

(56) References Cited

OTHER PUBLICATIONS

Popescu, et al. "Towards a theory of natural language interfaces to databases." Proceedings of the 8th international conference on Intelligent user interfaces. Jan. 2003, pp. 149-157, (Year: 2003).
Rao, The Table Lens: Merging Graphical and Symbolic Representation in an Interactive Focus + Context Visualization for Tabular Information, Apr. 1994, 7 pgs.
Roth, Interactive Graphic Design Using Automatic Presentation Knowledge, Apr. 24-28, 1994, 7 pgs.
Roth, Visage: A User Interface Environment for Exploring Information, Oct. 28-29, 2006, 9 pgs.
Screen Dumps for Microsoft Office Excel 2003 SP2, figures 1-36, 2003, pp. 1-19.
Spenke, Focus: The Interactive Table for Product Comparison and Selection, Nov. 1996, 10 pgs.
Setlur, Preinterview First Office Action, U.S. Appl. No. 16/234,470, dated Sep. 24, 2020, 6 pgs.
Setlur, First Action Interview Office Action, U.S. Appl. No. 16/234,470, dated Oct. 28, 2020, 4 pgs.
Setlur, Final Office Action, U.S. Appl. No. 16/234,470, dated Jun. 2, 2021, 49 pgs.
Setlur, Notice of Allowance, U.S. Appl. No. 16/234,470, dated Nov. 10, 2021, 14 pgs.
Stevens, On the Theory of Scales of Measurement, Jun. 7, 1946, 4 pgs.
Stephen G. Eick, "Visualizing Multi-Dimensional Data," Visual Insights, Inc., Feb. 2000, ACM SIGGRAPH computer graphics, ACM, pp. 1-7, (Year: 2000).
Stolte, Multiscale Visualization Using Data Cubes, 2002, 8 pgs.
Stolte, Notice of Allowance, U.S. Appl. No. 10/453,834, dated Mar. 27, 2006, 9 pgs.
Stolte, Notice of Allowance, U.S. Appl. No. 11/488,407, dated Dec. 29, 1999, 8 pgs.
Stolte, Notice of Allowance, U.S. Appl. No. 13/019,227, dated Nov. 10, 2011, 8 pgs.
Stolte, Notice of Allowance, U.S. Appl. No. 13/425,300, dated Dec. 10, 2013, 10 pgs.
Stolte, Office Action, U.S. Appl. No. 10/667,194, dated Jan. 7, 2008, 10 pgs.
Stolte, Office Action, U.S. Appl. No. 10/667,194, dated Feb. 9, 2009, 11 pgs.
Stolte, Office Action, U.S. Appl. No. 10/667,194, dated Aug. 14, 2007, 16 pgs.
Stolte, Office Action, U.S. Appl. No. 10/667,194, dated Aug. 14, 2008, 10 pgs.
Stolte, Office Action, U.S. Appl. No. 10/667,194, dated Jan. 18, 2007, 15 pgs.
Stolte, Office Action, U.S. Appl. No. 10/667,194, dated Jun. 26, 2006, 13 pgs.
Stolte, Office Action, U.S. Appl. No. 11/488,407, dated Apr. 3, 2009, 6 pgs.
Stolte, Office Action, U.S. Appl. No. 13/019,227, dated Apr. 18, 2011, 9 pgs.
Stolte, Office Action, U.S. Appl. No. 13/425,300, dated Mar. 15, 2013, 7 pgs.
Stolte, Office Action, U.S. Appl. No. 14/937,836, dated Oct. 7, 2016, 10 pgs.
Stolte, Notice of Allowance, U.S. Appl. No. 14/937,836, dated Mar. 1, 2017, 8 pgs.
Stolte, Office Action, U.S. Appl. No. 15/449,844, dated Jun. 29, 2017, 16 pgs.
Stolte, Final Office Action, U.S. Appl. No. 15/449,844, dated Feb. 6, 2018, 8 pgs.
Stolte, Notice of Allowance, U.S. Appl. No. 15/449,844, dated May 18, 2018, 9 pgs.
Stolte, Office Action, U.S. Appl. No. 15/582,478, dated Jul. 11, 2017, 16 pgs.
Stolte, Final Office Action, U.S. Appl. No. 15/582,478, dated Mar. 8, 2018, 10 pgs.
Stolte, Notice of Allowance U.S. Appl. No. 15/582,478, dated Jun. 26, 2018, 10 pgs.
Stolte, Notice of Allowance U.S. Appl. No. 16/056,396, dated Apr. 16, 2019, 10 pgs.
Stolte, Office Action, U.S. Appl. No. 16/056,819, dated Aug. 7, 2019, 12 pgs.
Stolte, Notice of Allowance, U.S. Appl. No. 16/056,819, dated Sep. 11, 2019, 8 pgs.
Stolte Notice of Allowance, U.S. Appl. No. 16/221,407, dated Aug. 22, 2022, 10 pgs.
Stolte Notice of Allowance, U.S. Appl. No. 16/283,700, dated Aug. 22, 2022, 11 pgs.
Stolte Office Action, U.S. Appl. No. 16/220,240, dated Aug. 7, 2019, 11 pgs.
Stolte, Notice of Allowance, U.S. Appl. No. 16/220,240, dated Sep. 11, 2019, 8 pgs.
Stolte Notice of Allowance, U.S. Appl. No. 16/137,457, dated Sep. 6, 2019, 10 pgs.
Stolte Notice of Allowance, U.S. Appl. No. 16/137,071, dated Sep. 11, 2019, 10 pgs.
Stolte, Polaris: A System for Query, Analysis, and Visualization of Multidimensional Relational Databases, Jan. 2002, 14 pgs.
Stolte, Query Analysis, and Visualization of Hierarchically Structured Data Using Polaris, Jul. 2002, 11 pgs.
Stolte, Specification, U.S. Appl. No. 10/453,834, dated Jun. 2, 2003, 114 pgs.
Stolte, Visualizing Application Behavior on Superscaler Processors, 1999, 9 pgs.
Tableau Software, IPRP, PCT/US2005/043937, dated Jun. 5, 2007, 9 pgs.
Tableau Software, IPRP, PCT/US2007/009810, dated Oct. 22, 2008, 7 pgs.
Tableau Software, ISR/WO, PCT/US2005/043937, dated Apr. 18, 2007, 9 pgs.
Tableau Software, ISR/WO, PCT/US2006/35300, dated Jul. 7, 2008, 6 pgs.
Tableau Software, ISR/WO, PCT/US2007/009810, dated Jul. 7, 2008, 8 pgs.
Tableau Software, Inc., International Search Report and Written Opinion, PCT/US2019/055169, dated Dec. 16, 2019, 12 pgs.
The Board of Trustees, Stanford, IPRP, PCT/US04/18217, dated Oct. 19, 2006, 4 pgs.
The Board of Trustees, Stanford, ISR/WO, PCT/US04/18217, dated Feb. 7, 2006, 6 pgs.
The Board of Trustees, Stanford, ISR/WO, PCT/US2004/30396, dated Aug. 24, 2006, 5 pgs.
The Board of Trustees, Stanford, IPRP, PCT/US2004/30396, dated Jan. 30, 2007, 3 pgs.
The Board of Trustees, Stanford, Supplementary ESR, EP 04754739.3, dated Dec. 17, 2007, 4 pgs.
Thearling, Visualizing Data Mining Models, 2001, 14 pgs.
Tory, First Action Preinterview Office Action, U.S. Appl. No. 16/219,406, dated Jul. 10, 2020, 7 pgs.
Tory, Notice of Allowance, U.S. Appl. No. 16/219,406, dated Sep. 9, 2020, 8 pgs.
Tory, Office Action, U.S. Appl. No. 16/575,354, dated Nov. 3, 2020, 17 pgs.
Tory, Office Action, U.S. Appl. No. 16/575,354, dated Sep. 20, 2021, 21 pgs.
Tory, Notice of Allowance, U.S. Appl. No. 16/575,354, dated Jan. 12, 2022, 9 pgs.
Tory, Office Action, U.S. Appl. No. 16/575,349, dated Oct. 13, 2020, 15 pgs.
Tory, Notice of Allowance, U.S. Appl. No. 16/575,349, dated Feb. 3, 2021, 9 pgs.
Tory, Office Action, U.S. Appl. No. 17/152,762, dated Oct. 27, 2022, 23 pgs.
Ward, XmdvTool: Integrating Multiple Methods for Visualizing Multi-Variate Data, 9 pgs.
Welling, Visualization of Large Multi-Dimensional Datasets, Aug. 11, 2000, 6 pgs.
Wilkinson, nViZn: An Algebra-Based Visualization System, Mar. 21-23, 2001, 7 pgs.

(56) References Cited

OTHER PUBLICATIONS

Wilkinson, Statistics and Computing—The Grammar of Graphics, 1999, 417 pgs.

* cited by examiner

HANDLING VAGUE MODIFIERS IN NATURAL LANGUAGE COMMANDS

RELATED APPLICATIONS

This application is a continuation of U.S. patent application Ser. No. 17/347,453, filed Jun. 14, 2021, entitled "Determining Ranges for Vague Modifiers in Natural Language Commands," which is a continuation of U.S. patent application Ser. No. 16/601,413, filed Oct. 14, 2019, entitled "Determining Ranges for Vague Modifiers in Natural Language Commands," now U.S. patent application Ser. No. 11,042,558, issued on Jun. 22, 2021, which claims priority to U.S. Provisional Application Ser. No. 62/897,187, filed Sep. 6, 2019, entitled "Interface Defaults for Vague Modifiers in Natural Language Interfaces for Visual Analysis," each of which is incorporated by reference herein in its entirety.

This application is related to the following applications, each of which is incorporated by reference herein in its entirety:

(i) U.S. patent application Ser. No. 16/166,125, filed Oct. 21, 2018, entitled "Determining Levels of Detail for Data Visualizations Using Natural Language Constructs," now U.S. Pat. No. 11,055,489, issued on Jul. 6, 2021;

(ii) U.S. patent application Ser. No. 16/219,406, filed Dec. 13, 2018, entitled "Identifying Intent in Visual Analytical Conversations," now U.S. Pat. No. 10,896,297, issued on Jan. 19, 2021; and (iii) U.S. patent application Ser. No. 16/234,470, filed Dec. 27, 2018, entitled "Analyzing Underspecified Natural Language Utterances in a Data Visualization User Interface," now U.S. Pat. No. 11,244,114, issued on Feb. 8, 2022.

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable users to understand data sets visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. Most systems return only very basic interactive visualizations in response to queries, and others require expert modeling to create effective queries. Other systems require simple closed-ended questions, and then are only capable of returning a single text answer or a static visualization.

Natural language has garnered interest as a useful modality for creating and interacting with visualizations. Natural language interaction techniques offer the promise of easy, intuitive engagement with data even for non-experts by enabling users to express their analytical goals as natural language utterances. Natural language interaction is effective when it supports questions pertaining to a user's information needs. However, supporting natural language interactions with visual analytical systems is often challenging. For example, users tend to provide utterances that are linguistically colloquial, underspecified, or ambiguous, while the visual analytics system has more complicated nuances of realizing these utterances against the underlying data and analytical functions. Users also expect high precision and recall from such natural language interfaces. In this respect, many natural language interfaces fail to accurately determine a user's information needs.

SUMMARY

There is a need for improved systems and methods that support natural language interactions with visual analytical systems. The present disclosure describes a data visualization application that employs a set of techniques for handling vague modifiers in natural language commands to generate useful data visualizations. The data visualization application uses interface defaults to generate useful data visualizations.

In accordance with some implementations, a method executes at a computing device having a display, one or more processors, and memory storing one or more programs configured for execution by the one or more processors. The computing device receives user selection of a data source and a first user input to specify a natural language command directed to the data source. The command includes a request for information about the data source. The computing device identifies a first keyword in the natural language command and identifies one or more second keywords in the natural language command, including one or more adjectives that modify the first keyword. The computing device generates a visual specification that specifies the data source, a plurality of visual variables, and a plurality of data fields from the data source. Each of the visual variables is associated with a respective one or more data fields of the plurality of data fields and each of the data fields is identified as either a dimension or a measure. The first keyword corresponds to one or more first data fields of the plurality of data fields, and one or more visual variables are associated with the one or more first data fields according to the one or more second keywords. The computing device generates and displays a data visualization (e.g., a plot, graph, chart, or map) based on the visual specification. The data visualization includes a plurality of visual marks representing data retrieved from the data source.

In some implementations, the computing device determines user intent based, at least in part, on the one or more second keywords. For example, when a user asks, "which of my grocery expenses is the highest this month?", the computing device may determine that the user wants to see a data visualization that highlights or points out the single highest grocery expense relative to all other grocery expenses, rather than a data visualization that shows only one grocery expense.

In some implementations, the computing device determines a data visualization type for the data visualization based, at least in part, on the determined user intent. For example, when a user asks, "which of my grocery expenses is the highest this month?", the computing device may determine that the best way to present the data is in the form of a bar chart instead of a pie chart (which may have slices that are hard to distinguish in size from one another when there are many grocery items).

In some implementations, the data visualization type is selected from the group consisting of Bar Chart (including histogram), Line Chart, Scatter Plot, Pie Chart, Map (including heat map, and forms of geographic maps such as topological maps, thematic maps, contour maps, weather maps, etc.), and Text Table.

In some implementations, the one or more visual variables are determined based on the determined data visualization type. For example, when the data visualization type is a map (such as a heat map representing average temperatures in July 2019 in the US), the visual variables may encode data points by emphasizing (e.g., highlighting or showing in a different color) and by deemphasizing rather than filtering data points. This maintains geographic context.

In some implementations, the computing device displays an initial data visualization (e.g., the initial data visualization 310, shown in FIG. 3A) in response to receiving the user selection of a data source. In some implementations, the computing device determines the context based on the initial data visualization. For example, a user my specify the natural language command "show me tall students" after seeing an initial data visualization showing heights of different students in kindergarten. The initial data visualization may show heights that range from 40 inches to 47 inches, providing a context of how the word "tall" should be interpreted. While 47 inches would not be considered a "tall" height for an adult, it would be considered tall within the context provided by the initial data visualization of kindergarten students.

In some implementations, the initial data visualization has a first data visualization type and the data visualization is generated in accordance with the first data visualization type (e.g., the data visualization 320 has the same data visualization type as the initial data visualization 310, as shown in FIGS. 3A and 3B). For example, the computing device may modify an initial data visualization to include highlighting or shading, or to filter out some data points in response to a natural language command. By generating a new data visualization that has the same data visualization type, the user may retain the context of the initial data visualization and better understand or interpret the results.

In some implementations, the initial data visualization includes visual marks and the computing device determines the shape of the visual marks in the initial data visualization. The computing device also determines the one or more visual variables for the data visualization based on the shape of the visual marks in the initial data visualization (see FIGS. 4A-4C).

In some implementations, the computing device categorizes the shape of the visual marks in the initial data visualization into one of: (i) an exponential drop off, (ii) an inverse exponential curve, or (iii) a series of plateaus. The one or more visual variables for the data visualization are determined in accordance with the categorized shape (see FIGS. 4A-4C).

In some implementations, the computing device determines characteristics (e.g., shape, color, and/or size) of the visual marks in the data visualization based on the visual specification (including the one or more visual variables). This is illustrated in FIGS. 4A-4C.

In some implementations, the computing device categorizes the expected shape of the visual marks in the data visualization into one of: (i) an exponential drop off, (ii) an inverse exponential curve, or (iii) a series of plateaus. The one or more visual variables for the data visualization are determined in accordance with the categorized shape (see FIGS. 4A-4C).

In some implementations, a first subset of the visual marks is emphasized (e.g., highlighted, labeled, displayed in a different color, or displayed with a different fill pattern) relative to a second subset of the visual marks, distinct from the first subset of the visual marks. In some implementations, the second subset of the visual marks is deemphasized (e.g., grayed out, dimmed, or shaded) relative to the first subset of the visual marks (see FIGS. 3D-3E and 4A-4C).

In some implementations, the first subset of the visual marks includes two or more visual marks (see FIGS. 3E and 4A-4C).

In some implementations, the first subset of the visual marks is determined based on the one or more second keywords. For example, in response to the natural language command "show me the tallest student in the class" regarding a data source that includes the height of students in a class, the word "tallest" is the second keyword and the first subset of visual marks that is highlighted corresponds to the student that is the tallest.

In some instances, the one or more visual variables specify a filter to be applied to the one or more first data fields (see FIGS. 3B-3C). For example, in response to the natural language command "show me the tall students" regarding a data source that includes the height of students in a class, a filter (e.g., height >45 inches) is applied to the data field "height" and only students who are taller than 45 inches are shown in the data visualization.

In some implementations, the one or more second keywords includes a superlative adjective. Examples of superlative adjectives are "tallest," "cheapest," "most," and "least."

In some implementations, the one or more second keywords include a graded adjective. Examples of graded adjectives are "expensive," "interesting," and "short."

In some implementations, the first user input is a verbal user input and/or a user input of text into a natural language input field. For example, a user may provide a verbal command into a microphone or may type text into a text field via a keyboard or touch screen. Additionally, the user may provide a natural language command via gestures or touches that can be interpreted by a computing device (for example, via input technology for people with disabilities).

Typically, an electronic device includes one or more processors, memory, a display, and one or more programs stored in the memory. The programs are configured for execution by the one or more processors and are configured to perform any of the methods described herein.

In some implementations, a non-transitory computer-readable storage medium stores one or more programs configured for execution by a computing device having one or more processors, memory, and a display. The one or more programs are configured to perform any of the methods described herein.

Thus methods, systems, and graphical user interfaces are disclosed that allow users to efficiently generate and modify data displayed within a data visualization application by using natural language commands.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The various methods and devices disclosed in the present specification improve the effectiveness of natural language interfaces on data visualization platforms by using interface defaults when handling vague (e.g., ambiguous) modifiers in natural language commands directed to a data source. The data visualization platform automatically generates and displays a data visualization (or an updated data visualization) of retrieved data sets in response to the natural language input. The data visualization uses data visualization defaults (e.g., predetermined defaults) in displaying the visual information to the user.

Figure 1:
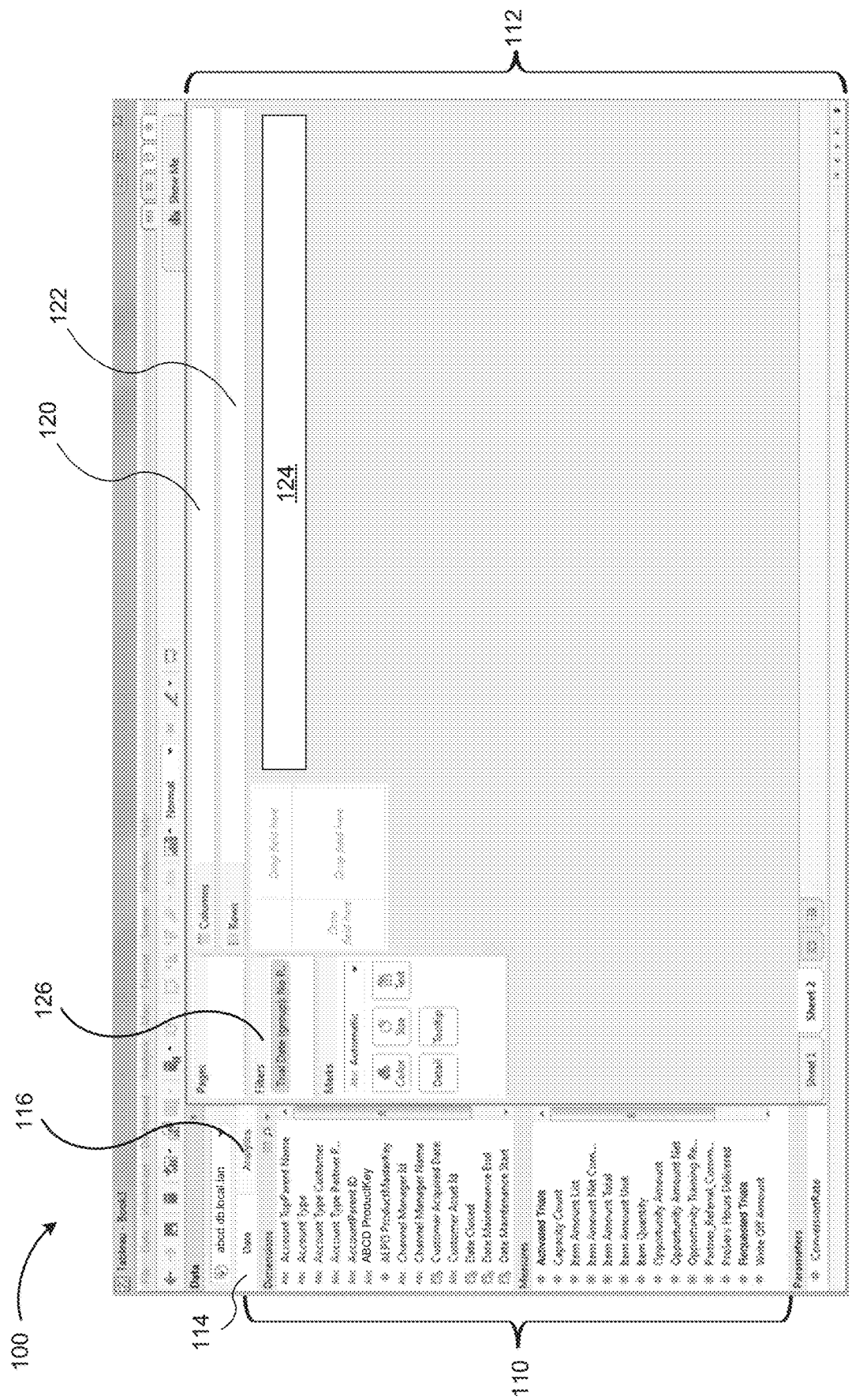
FIG. 1 illustrates a graphical user interface used in some implementations.

FIG. 1 illustrates a graphical user interface 100 for interactive data analysis in a data visualization application. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization or "data viz"). Because no data elements have been selected yet, the space initially has no visual graphic. In some implementations, the data visualization region 112 has multiple layers that are referred to as sheets. In some implementations, the data visualization region 112 includes a region 126 for data visualization filters. In some implementations, the filter region 126 is used both for receiving user input to specify filters as well as displaying what data fields have been selected for use in filters.

In some implementations, the graphical user interface 100 also includes a natural language input box 124 (also referred to as a command box) for receiving natural language commands. A user may interact with the command box to provide commands. For example, the user may provide a natural language command by typing the command in the natural language input box 124. In addition, the user may indirectly interact with the command box by speaking into a microphone 220 to provide commands.

In some instances, a user initially associates data elements with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and/or on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

For example, a user may input a natural language command that requests information related to a data source and/or a currently displayed data visualization. In many instances, natural language commands include adjectives, such as "affordable" or "tall." Such adjectives (or "modifiers") can be challenging to handle when processing natural language commands. Some properties of adjectives that pose challenges in processing natural language commands include: (i) gradedness, (ii), antonyms versus "not"-adjectives, (iii), components, and (iv) subjectivity.

Referring to graded adjectives (e.g., grad-able adjectives), many adjectives are or can be graded, meaning that they can be interpreted on a scale (e.g., from more expensive to less expensive). This interpretation is context-specific, sensitive to the distribution of the values, and can also depend on a relative value and/or an absolute value. For example, Kyle has an expensive car that is a BMW. However, Kyle's car is not expensive for a BMW since it is the least expensive BMW model available.

Referring to antonyms versus "not"-adjectives, an antonym can be interpreted differently from a not-adjective. For example, items labeled as "cheap" may be different than those labeled as "not expensive." For instance, a $15 bottle of wine may be labeled as "not expensive" or "inexpensive" but may not be included in the "cheap" section of the wine store. The "cheap" section of the wine store may only include wine bottles that are under $8.

Referring to adjectives with different components, some adjectives are associated with multiple distinct attributes, and the relevant attribute may depend on context or be unclear. For example, the adjective "cheap" can be associated with either price or quality (or both), whereas an adjective like "tall" is associated solely with height.

Referring to subjectivity, some adjectives are more subjective than others. For example, when a data source containing information about professional athletes has been selected, a user may request, "show me tall male athletes."

In this case, "tall" is a subjective adjective. A person who is 5 feet 5 inches in height may consider someone who is 6 feet or taller as "tall," but a person who is 6 feet in height may consider 6 feet and 6 inches or taller as "tall." Additionally, subjective adjectives can be interpreted differently based on context. For example, most professional basketball players are well over 6 feet tall, so an athlete whose height is 6 feet 4 inches may be considered "tall" in general but not a "tall" basketball player. Conversely, an average jockey is approximately 5 feet 6 inches in height. Thus, even though an average male (in 2019) is 5 feet 9 inches in height, a jockey who is 5 feet 9 inches in height may be considered tall and a professional basketball player who is 5 feet 9 inches in height would probably be considered short.

Due to the many ways that adjectives can be interpreted based on context and/or user intent, a data visualization application can utilize aspects of the data source and/or a currently displayed data visualization to determine a context and/or user intent when handling natural language commands that include such adjectives (e.g., modifiers). In some implementations, the data visualization application includes interface defaults for handling natural language commands that include vague or subjective modifiers so that generated data visualizations display information in a manner that is in line with most user's expectations (e.g., does not deviate from the user intent or the context of the information being analyzed).

Figure 2A:
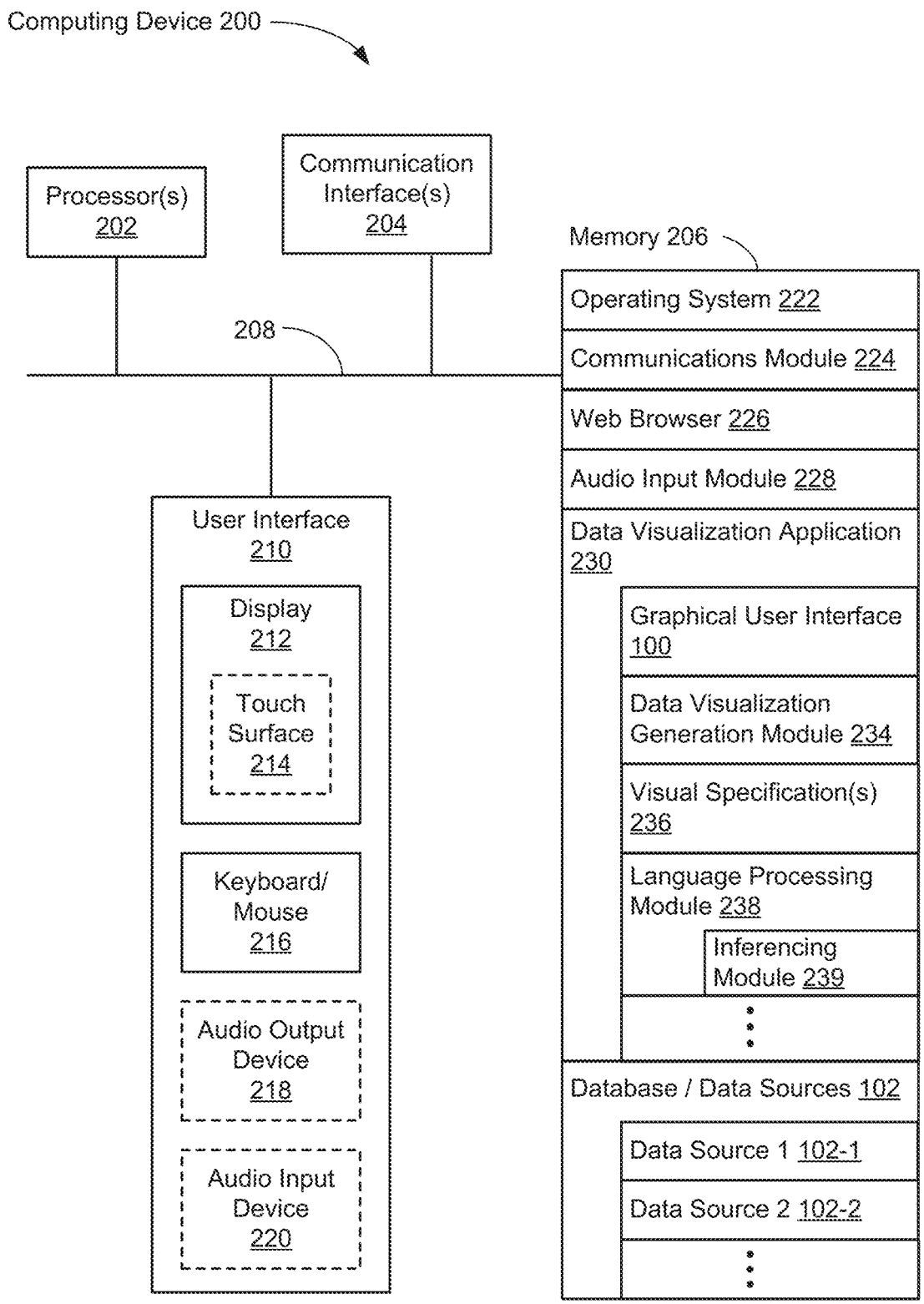
FIG. 2A is a block diagram illustrating a computing device according to some implementations.

FIG. 2A is a block diagram illustrating a computing device 200 that can execute a data visualization application 230 or a data visualization web application to display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. In some implementations, the communication buses 208 include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively, or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition software to supplement or replace the keyboard. An audio input device 220 (e.g., a microphone) captures audio (e.g., speech from a user).

The memory 206 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. The data visualization application 230 includes a graphical user interface 100 (e.g., as illustrated in FIG. 1) for a user to construct visual graphics. For example, a user selects one or more data sources 102 (which may be stored on the computing device 200 or stored remotely), selects data fields from the data sources, and uses the selected fields to define a visual graphic; and
- zero or more databases or data sources 102 (e.g., a first data source 102-1 and a second data source 102-2), which are used by the data visualization application 230. In some implementations, the data sources are stored as spreadsheet files, CSV files, text files, JSON files, XML files, or flat files, or stored in a relational database.

In some implementations, the data visualization application 230 includes a data visualization generation module 234, which takes user input (e.g., a visual specification 236), and generates a corresponding visual graphic. The data visualization application 230 then displays the generated visual graphic in the graphical user interface 100. In some implementations, the data visualization application 230 executes as a standalone application (e.g., a desktop application). In some implementations, the data visualization application 230 executes within the web browser 226 or another application using web pages provided by a web server (e.g., a server-based application).

In some implementations, the information the user provides (e.g., user input) is stored as a visual specification 236. In some implementations, a visual specification 236 includes previous natural language commands received from a user or properties specified by the user through natural language commands. In some implementations, a visual specification 236 includes interface defaults for displaying information in a data visualization.

In some implementations, the data visualization application 230 includes a language processing module 238 for processing (e.g., interpreting) commands provided by a user of the computing device. In some implementations, the commands are natural language commands (e.g., captured by the audio input device 220 or input via the touch surface 214 or the one or more input buttons such as buttons on a keyboard/mouse 216). In some implementations, the language processing module 238 includes sub-modules, such as an inferencing module 239. An inferencing module 239 is used to resolve underspecified (e.g., omitted information) or ambiguous (e.g., vague) natural language commands (e.g., expressions or utterances) directed to databases or data sources 102. As will be explained in further detail, the inferencing module 239 includes algorithms for inferring reasonable defaults for natural language commands that include vague (e.g., ambiguous) concepts such as "high," "not expensive," and "popular."

In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 206 stores a subset of the modules and data structures identified above. Furthermore, the memory 206 may store additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
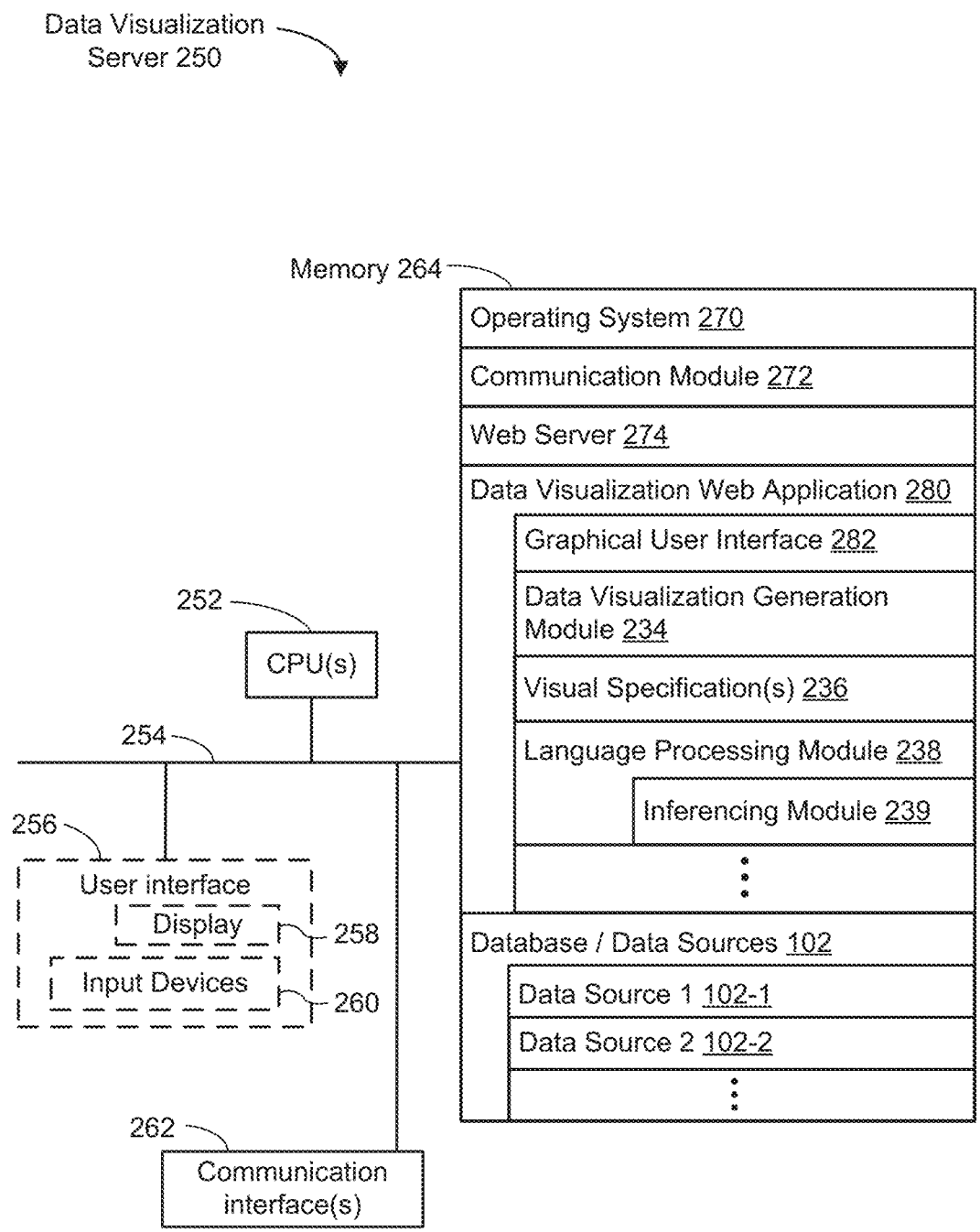
FIG. 2B is a block diagram illustrating a data visualization server according to some implementations.

FIG. 2B is a block diagram illustrating a data visualization server 250 according to some implementations. A data visualization server 250 may host one or more databases that include data sources 102 or may provide various executable applications or modules. A server 250 typically includes one or more processing units/cores (CPUs) 252, one or more communication network interfaces 262, memory 264, and one or more communication buses 254 for interconnecting these components. In some implementations, the server 250 includes a user interface 256, which includes a display 258 and one or more input devices 260, such as a keyboard and a mouse. In some implementations, the communication buses 254 include circuitry (sometimes called a chipset) that interconnects and controls communications between system components.

In some implementations, the memory 264 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 264 includes one or more storage devices remotely located from the CPUs 250. The memory 264, or alternatively the non-volatile memory devices within the memory 264, comprises a non-transitory computer readable storage medium.

In some implementations, the memory 264, or the computer readable storage medium of the memory 264, stores the following programs, modules, and data structures, or a subset thereof:

- an operating system 270, which includes procedures for handling various basic system services and for performing hardware dependent tasks;
- a network communication module 272, which is used for connecting the server 250 to other computers via the one or more communication network interfaces 262 (wired or wireless) and one or more communication networks, such as the Internet, other wide area networks, local area networks, metropolitan area networks, and so on;
- a web server 274 (such as an HTTP server), which receives web requests from users and responds by providing responsive web pages or other resources;
- a data visualization web application 280, which may be a web application that is downloaded and executed by a web browser on a user's computing device 200 (e.g., downloading individual web pages as needed). In general, a data visualization application web has the same functionality as a desktop data visualization application, but provides the flexibility of access from any device at any location with network connectivity, and does not require installation and maintenance. In some implementations, the data visualization web application 280 includes various software modules to perform certain tasks. In some implementations, the data visualization web application includes a graphical user interface 282, which provides the user interface for all aspects of the data visualization web application 280; and
- a database that stores zero or more data sources 102, as described above for a client device 200.

In some implementations, the data visualization web application 280 includes a data visualization generation module 234 and/or a language processing module 238 (including an inferencing module 239), as described above for a client device 200. In some implementations, the data visualization web application 280 stores visual specifications 236, which are used to build data visualizations.

Although FIG. 2B shows a data visualization server 250, FIG. 2B is intended more as a functional description of the various features that may be present rather than as a structural schematic of the implementations described herein. In practice, and as recognized by those of ordinary skill in the art, items shown separately could be combined and some items could be separated.

Figure 3A:
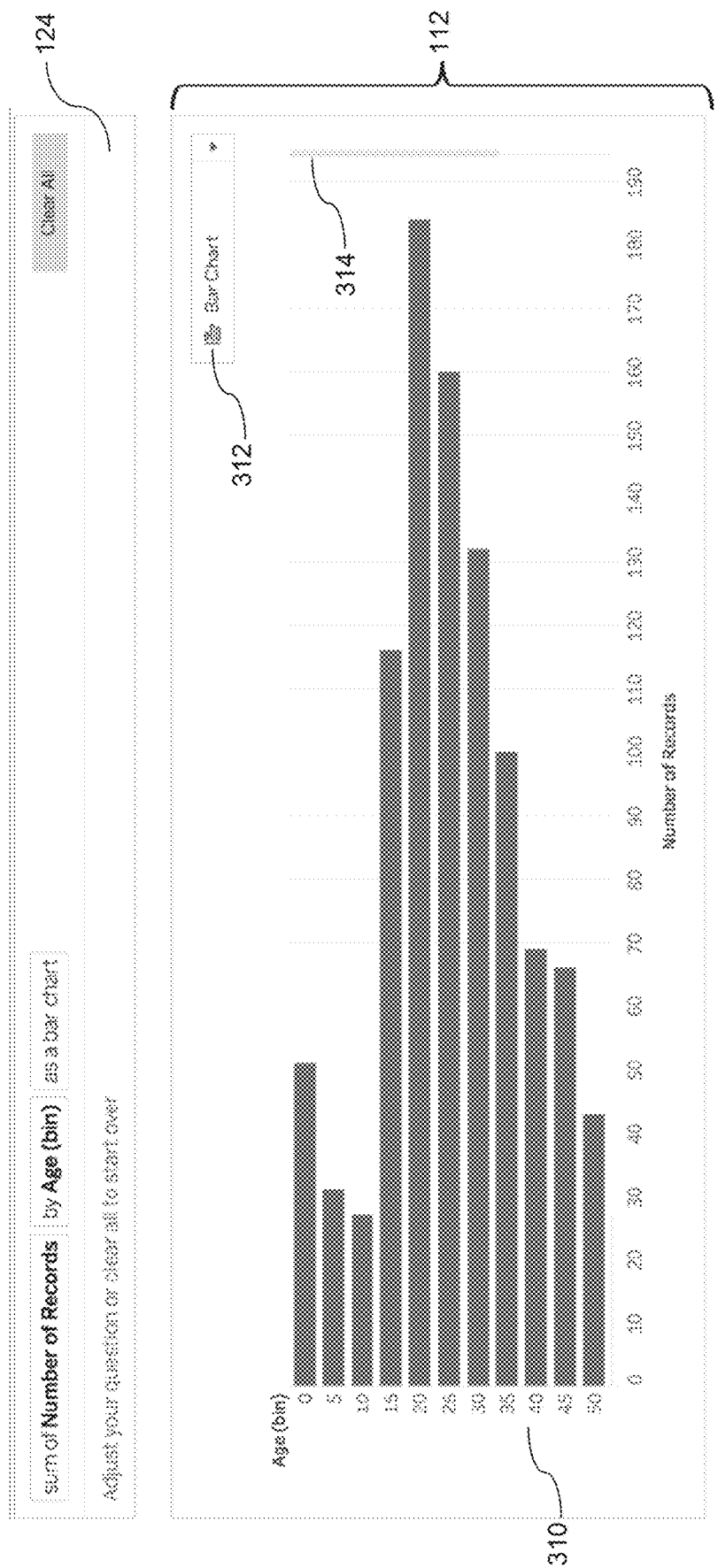
FIGS. 3A-3E provide examples of data visualizations in accordance with some implementations.

FIGS. 3A-3E provide examples of data visualizations in accordance with some implementations. A graphical user interface 100 for a data visualization application 230 is shown in FIG. 3A. As described above with respect to FIG. 1, the graphical user interface includes a data visualization region 112 and a natural language input box 124 (e.g., a command box). The data visualization region 112 displays an initial data visualization 310 and includes an interactive user affordance 312 that displays the type of data visualization ("bar chart") currently being displayed. In some implementations, as shown, the interactive user affordance 312 is a drop down box that allows a user to specify the data visualization type to be displayed in the data visualization region 112. As shown, the initial data visualization 310 displays information from a data source that includes information on patients at a clinic. The initial data visualization 310 is a bar chart showing the number of patients that visited the clinic by age (binned unto 5-year ranges). The scroll bar 314 enables a user to see additional age ranges (i.e., for ages 55 and over). The initial data visualization 310 may have been generated in response to a user input that is a natural language command or a user's actions to select data fields to be displayed. For example, a user may have selected "number of records" to be plotted by "age" in a bar chart in order to generate the initial data visualization 310. Alternatively, the user may provide a natural language command, "show me the number of patients by age." In response to the user input, the initial data visualization 310 is generated and displayed in the data visualization region 112. In some implementations, the initial data visualization 310 is generated automatically when the data source is selected. Once a data source is selected, the data visualization application 230 generates a visual specification that specifies the selected data source, a plurality of visual variables, and a plurality of data fields from the data source. Each of the visual variables is associated with a respective one or more of the data fields and each of the data fields is identified as either a dimension or a measure. The visual variables include information that encode how the data visualization will look (e.g., data visualization type, what data points will be displayed or represented as visual marks, the color scheme of visual marks, or emphasizing certain visual marks). A data visualization is generated and displayed based on the visual specification.

In some instances, a user wants to know more information from the data source. For example, a user may ask, "what age are most of the patients?" In this example, "most" is a superlative adjective indicating that the user may want to see the age that has the most (e.g., greatest) number of records. In response to the natural language command, the data visualization application 230 identifies a first keyword in the natural language command and one or more second keywords in the natural language command that are adjectives that modify the first keyword. In this example, the first keyword is "age" and the one or more second keywords includes "most." The data visualization then generates a visual specification or modifies an existing visual specification so that the first keyword corresponds to one or more first data fields of the plurality of data fields (e.g., select the data field corresponding to a total or sum). The one or more visual variables are associated with the one or more first data fields according to the one or more second keywords (e.g., visual variables associated with filtering or emphasizing/deemphasizing is associated with a data field corresponding to a number of patients by age so that the age bins that have the greatest number of records are emphasized/highlighted or shown). The data visualization application 230 then generates a data visualization in accordance with (e.g., based on) the visual specification and displays the data visualization in the data visualization region 112.

In some instances, the data visualization application 230 determines user intent based, at least in part, on the one or more second keywords (e.g., "most"). For example, while "most" is a superlative adjective that by definition refers to a single age bin (e.g., the single age bin that has the most number of records), the data visualization application 230 may determine that the user intent may not be to apply a filter. Instead, the data visualization application 230 may determine that the user intent is to identify multiple age bins that have the most number of records. The data visualization may instead highlight the five age bins that have the five largest number of records. Additionally, the data visualization application 230 may also determine the data visualization type for the data visualization based, at least in part, on the determined user intent. For example, the data visualization application 230 may determine that a bar chart is an appropriate data visualization type because the user has asked for information regarding the number of records by age bin. The data visualization type may be one of: a Bar Chart, a Line Chart, a Scatter Plot, a Pie Chart, a Map, or a Text Table.

In some implementations, the initial data visualization provides a context for the data visualization application 230 to interpret the natural language command and/or to determine the user intent. For example, when a user provides the natural language command, "what age are most of the patients?" while the initial data visualization 310 is displayed, the data visualization application 230 may maintain the context of the initial data visualization 310 and choose to highlight or filter the information displayed in the initial data visualization 310 and keep the same data visualization type and color scheme rather show a new data visualization that is a completely different data visualization type or has visual marks (e.g., bars) that have completely different colors.

Figure 3B:
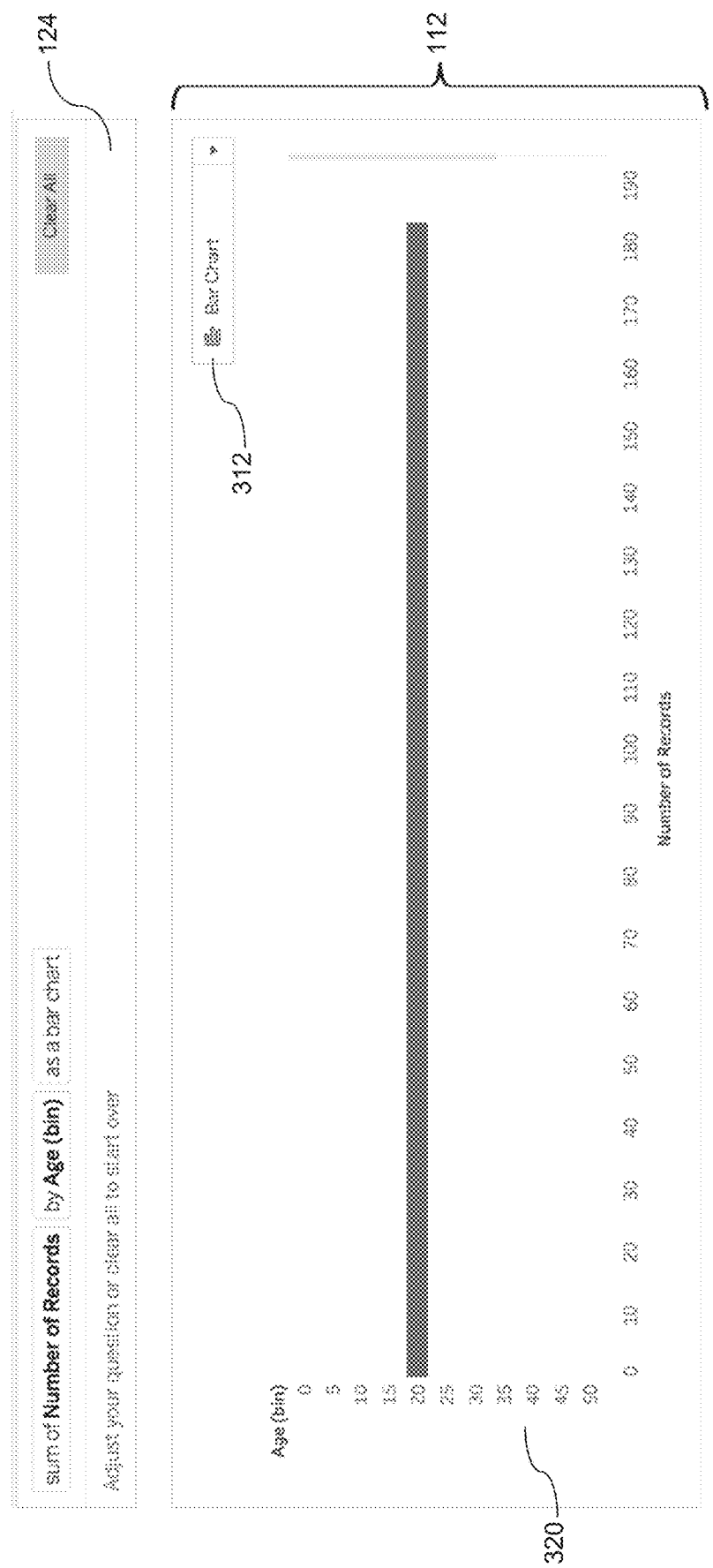
Figure 3C:
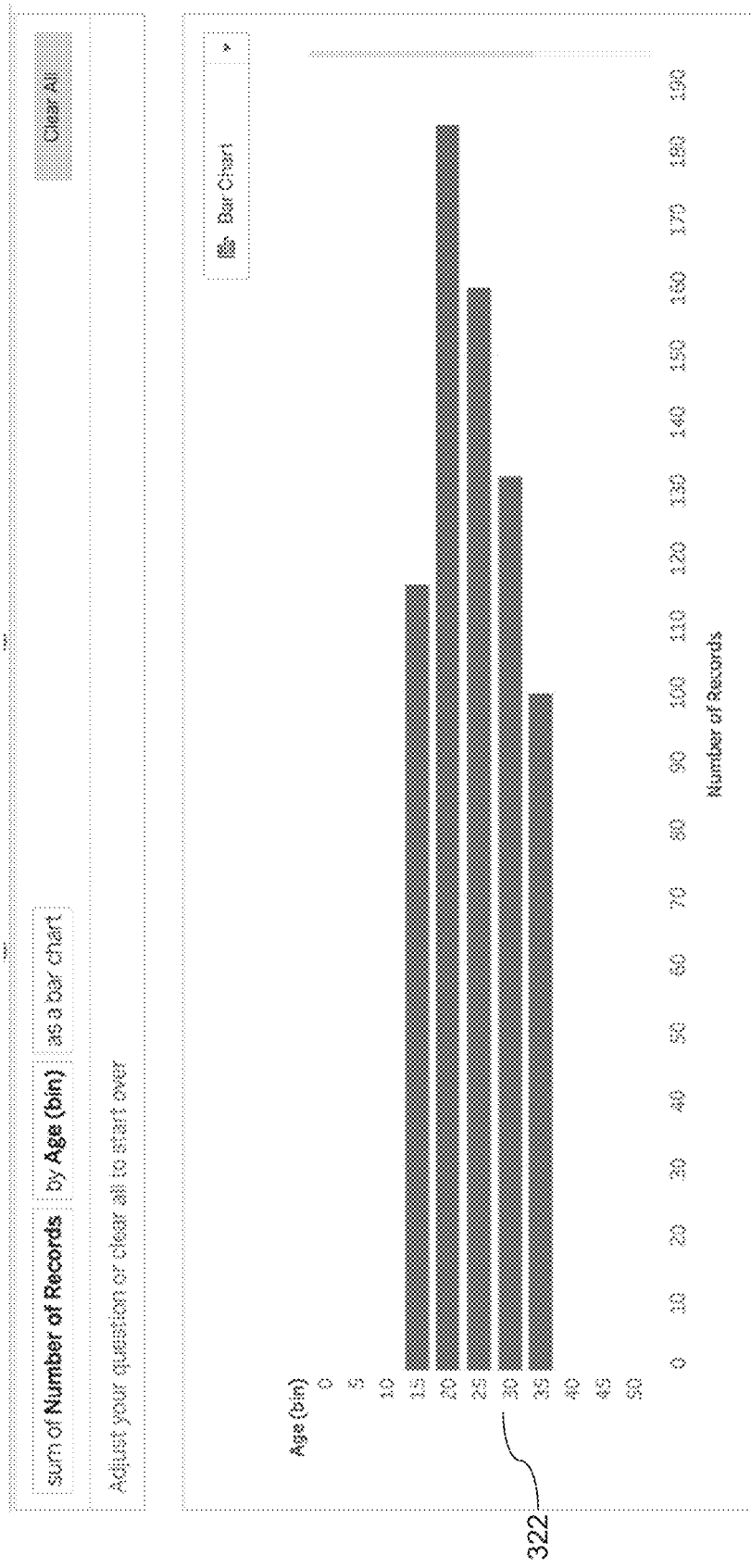

In some instances, as shown in FIG. 3B, the data visualization application 230 filters the data so that data visualization 320 shows only the age that has the largest number of patients (e.g., age bin "20"). While this fulfills the user request, it may be helpful to show not just the age bin with the largest number of records, but several age bins that have the top five largest number of patients. Instead of filtering to show only the age bin with the largest number of records (i.e., the one top result), the data visualization application 230 may instead filter the data to show five age bins that have the five largest number of records (e.g., the top five results). FIG. 3C shows a data visualization 322 that displays the five age bins that have the highest number of patients.

Figure 3D:
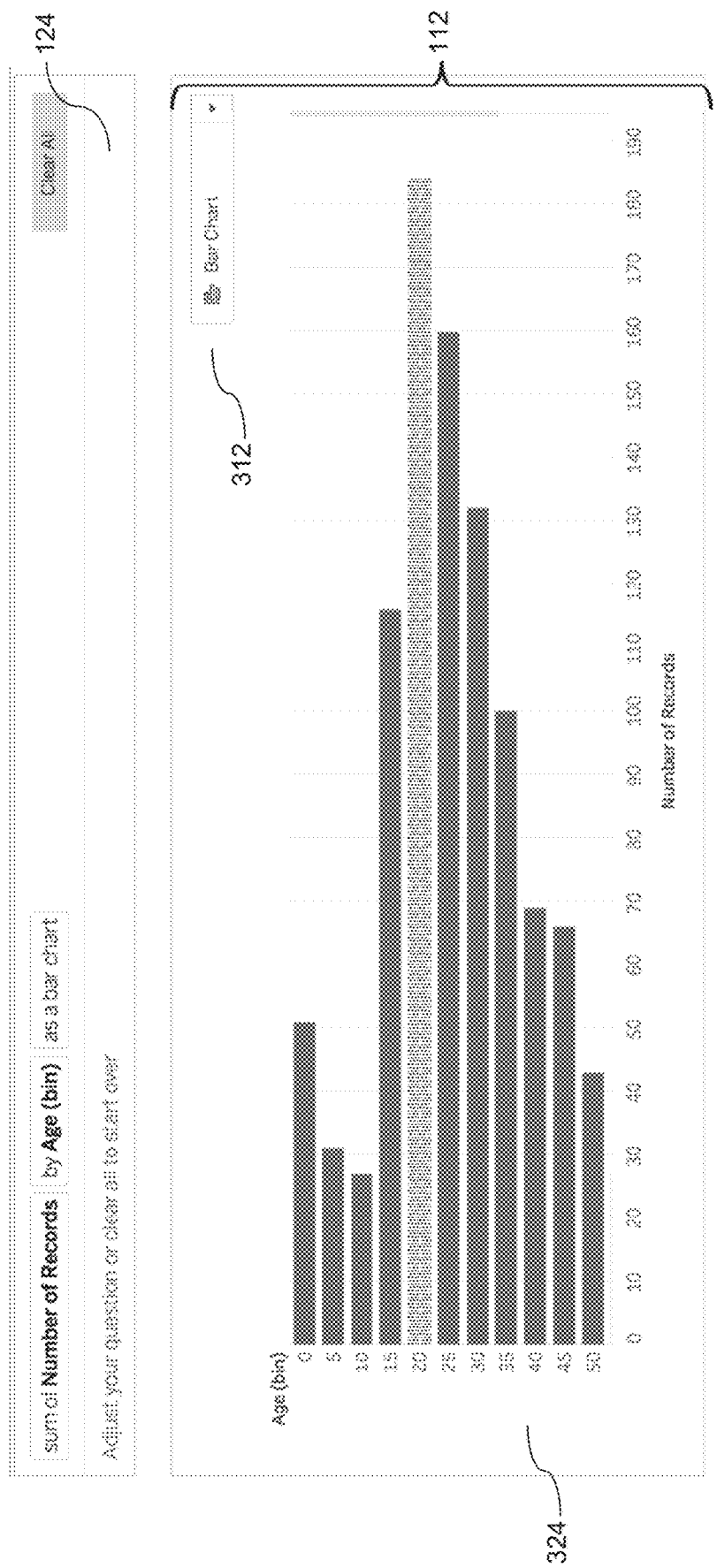
Figure 3E:
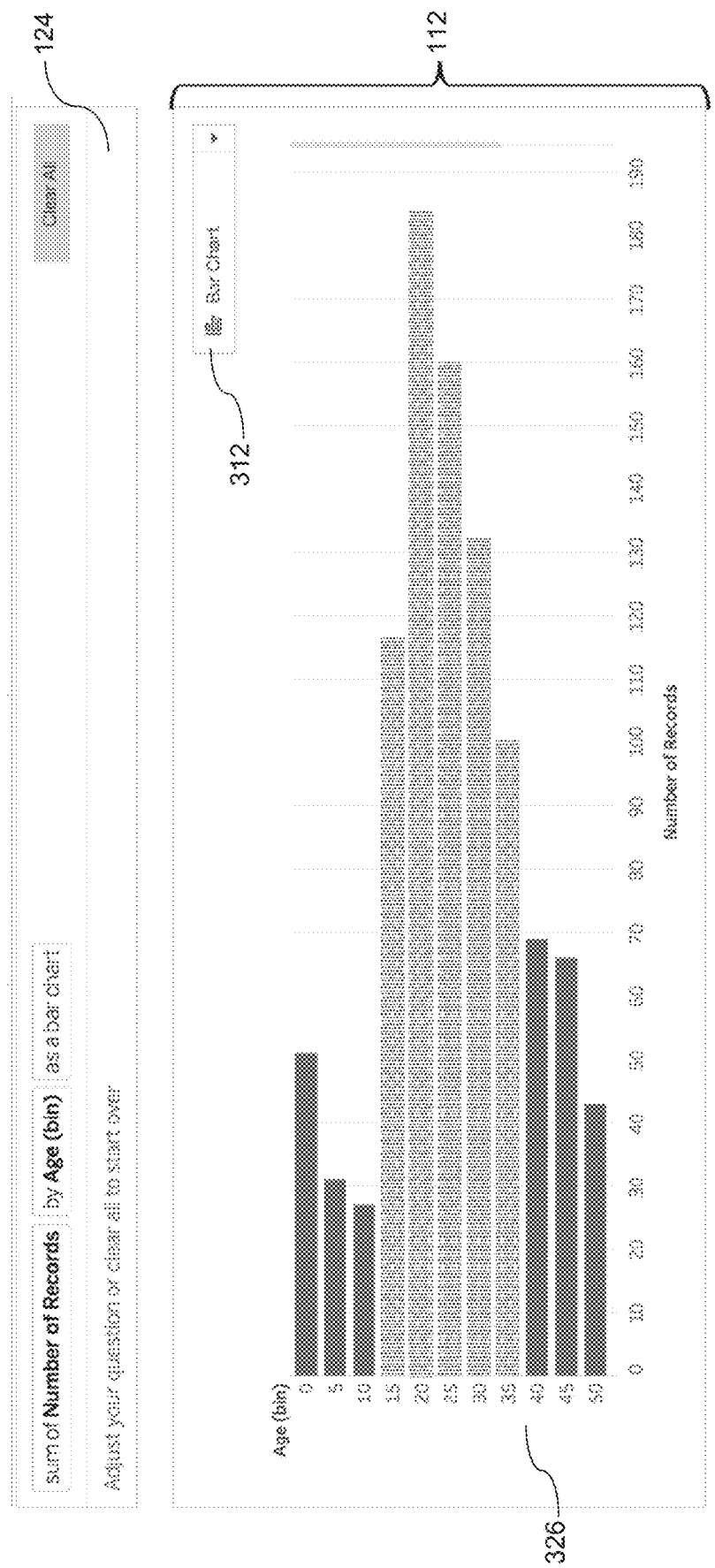

Alternatively, it may be helpful for the user to visualize the results (e.g., top result or top five results) within the context of the rest of the data. For example, a data visualization showing that 185 patients are within the 20 year old age bin is more meaningful when the total number of patients or the number of patients in other age groups are also shown. Thus, in some instances, the data visualization application 230 emphasizes the top result relative to the rest of the data, as shown in FIG. 3D. In FIG. 3D, a data visualization 324 displays information regarding the number of patients in each age bin (e.g., age group, age category) and highlights the top result (the age bin "20"), illustrated with a fill pattern or color. FIG. 3E shows a data visualization 326, which displays information regarding the number of patients in each age bin and highlights the top five results, illustrated with a fill pattern or color. In both cases, the requested information (e.g., "what age are most of the patients?") is shown emphasized (e.g., highlighted) with respect to the rest of the data in order to provide context.

The decision on whether to: (i) show a singular result (e.g., filter to a singular top result), (ii) show multiple results (e.g., filter to a top few results), (iii) highlight a single result, or (iv) highlight multiple top results may be based on different factors, including but not limited to: (A) an interpretation of the adjective (based on context and/or user intent); (B) the data visualization type (chart type); and/or (C) the data visualization shape.

A description of how an adjective may be interpreted based on context and/or user intent is provided above in the discussion following FIG. 1. Following is an example of how the interpretation of an adjective can determine how information is displayed in a data visualization. When a natural language command includes an adjective that is a single superlative (e.g., "tallest" or "most expensive") the data visualization application 230 may generate a data visualization that highlights only a top result instead of highlighting multiple top results. The data visualization may also take into consideration other factors in deciding how the data is displayed in the data visualization. Thus, even if a natural language command includes a single superlative, the data visualization may display multiple top results that are highlighted rather than a single top result that is highlighted due to a shape of the data visualization (e.g., the shape of the visual marks of the data visualization) or a data visualization type.

The data visualization type may determine, at least in part, how the data is displayed (e.g., the one or more visual variables in the visual specification may be determined based, at least in part, on the data visualization type). For example, while it may make sense to highlight a single top result in a data visualization that is a bar chart, it may not make sense to highlight a single top result in a data visualization that is a scatter plot (e.g., showing a single dot). In another example, when a data visualization is a heat map (for instance, population in the US by state), it may not make sense to show filtered results—the data visualization type dictates that the states and state outlines need to still be shown (in order to maintain context that this is a map of the United States and for a user to be able to discern which state they are looking at) and thus, the data visualization will display either a highlighted single result or highlighted multiple results.

The shape (e.g., visual pattern) of the visual marks in an initial data visualization may determine, at least in part, how information is displayed in a subsequent data visualization (e.g., the one or more visual variables in the visual specification may be determined based on the overall shape of the visual marks in the initial data visualization). In other cases, an expected shape for a data visualization is determined based on statistical properties of data values for the data fields. When a user provides a natural language command asking for information regarding a data source, the statistical properties of data values of the data fields in the data source can provide some insight into how the data visualization is expected to look (e.g., the shape or visual pattern of the visual marks in the data visualization). Thus, the data visualization application 230 may determine how the information is displayed in the data visualization based on an expected shape of the visual marks in the data visualization. This is different from the case where a user provides a natural language command asking for information based on a currently displayed data visualization (for example, an initial data visualization). When an initial data visualization is already displayed, the data visualization application 230 may determine how the results will be displayed in a subsequent data visualization (e.g., a new or modified data visualization) based on the shape of the visual marks in the currently displayed data visualization. For example, when interpreting a natural language command that says "show me what grade most of the students received," a data visualization may use an empirical rule for highlighting or filtering a data visualization having visual marks that resemble a normal distribution (e.g., a bell-curve shape, Gaussian distribution), thereby highlighting or showing only information within one standard deviation from the mean (e.g., highlight visual marks between the 16th percentile and the 84th percentile). However, when the data visualization application 230 has visual marks that resemble a bimodal distribution, the data visualization application 230 may simply filter or highlight the modal grades.

In some instances, the data visualization application 230 categorizes the shape of visual marks in a data visualization into one of: (i) an exponential drop off, (ii) an inverse exponential curve, or (iii) a series of plateaus, and one or more visual variables for the data visualization is determined in accordance with the categorized shape. The categorized shape can be used to determine how many of the visual marks correspond to a user-specified vague modifier.

Figure 4A:
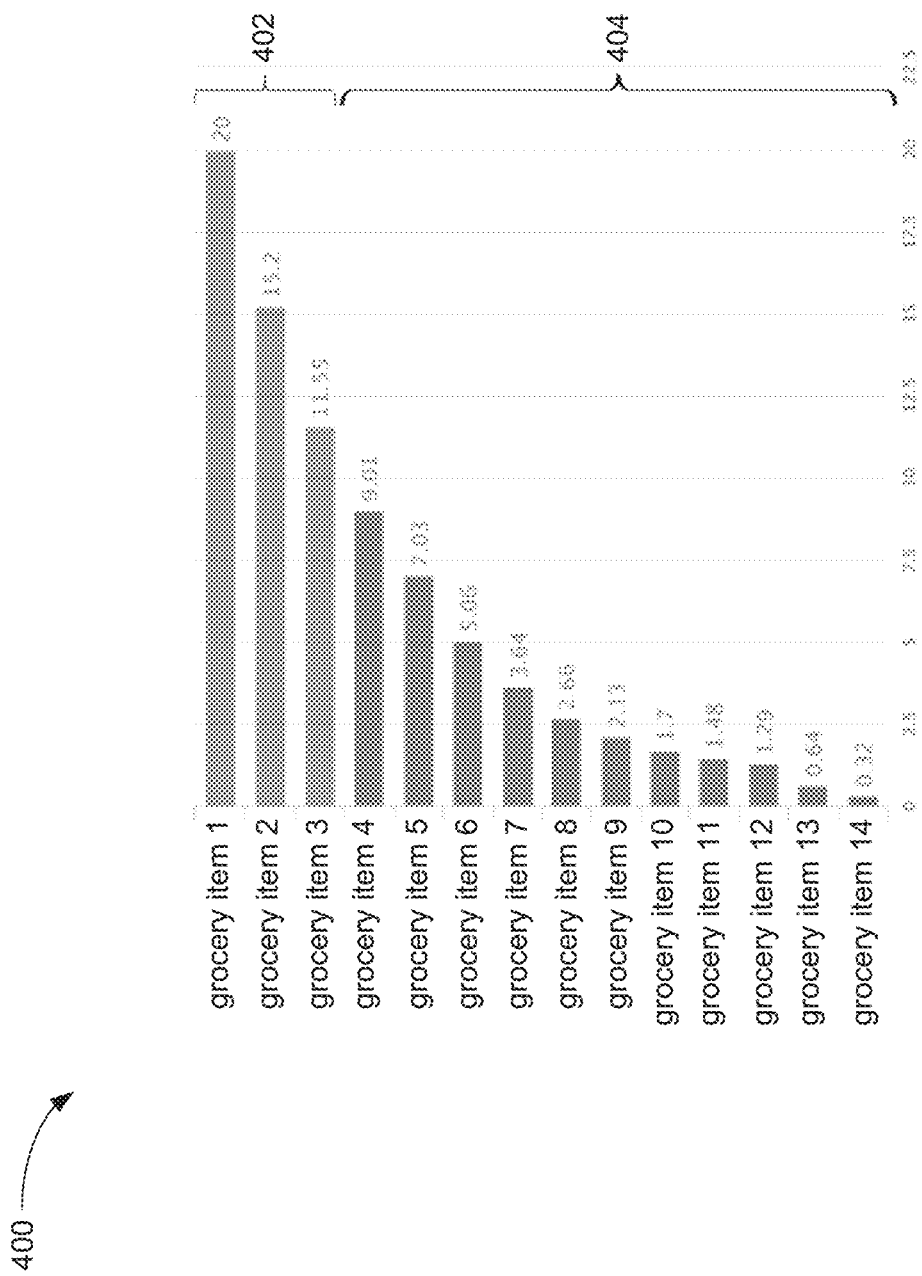
FIGS. 4A-4C provide examples of emphasized visual marks in data visualizations, where the emphasis is based on shape, in accordance with some implementations.
Figure 4B:
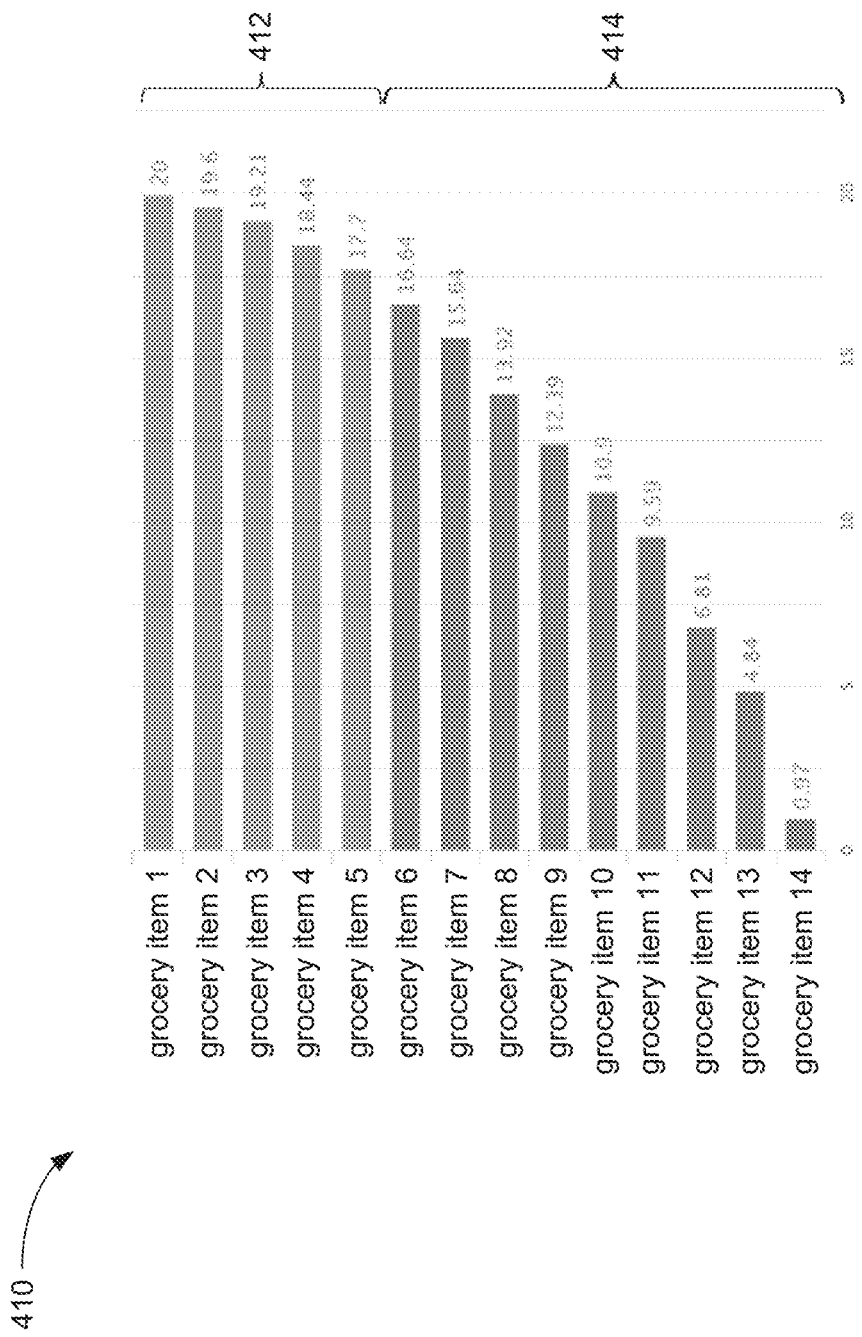
Figure 4C:
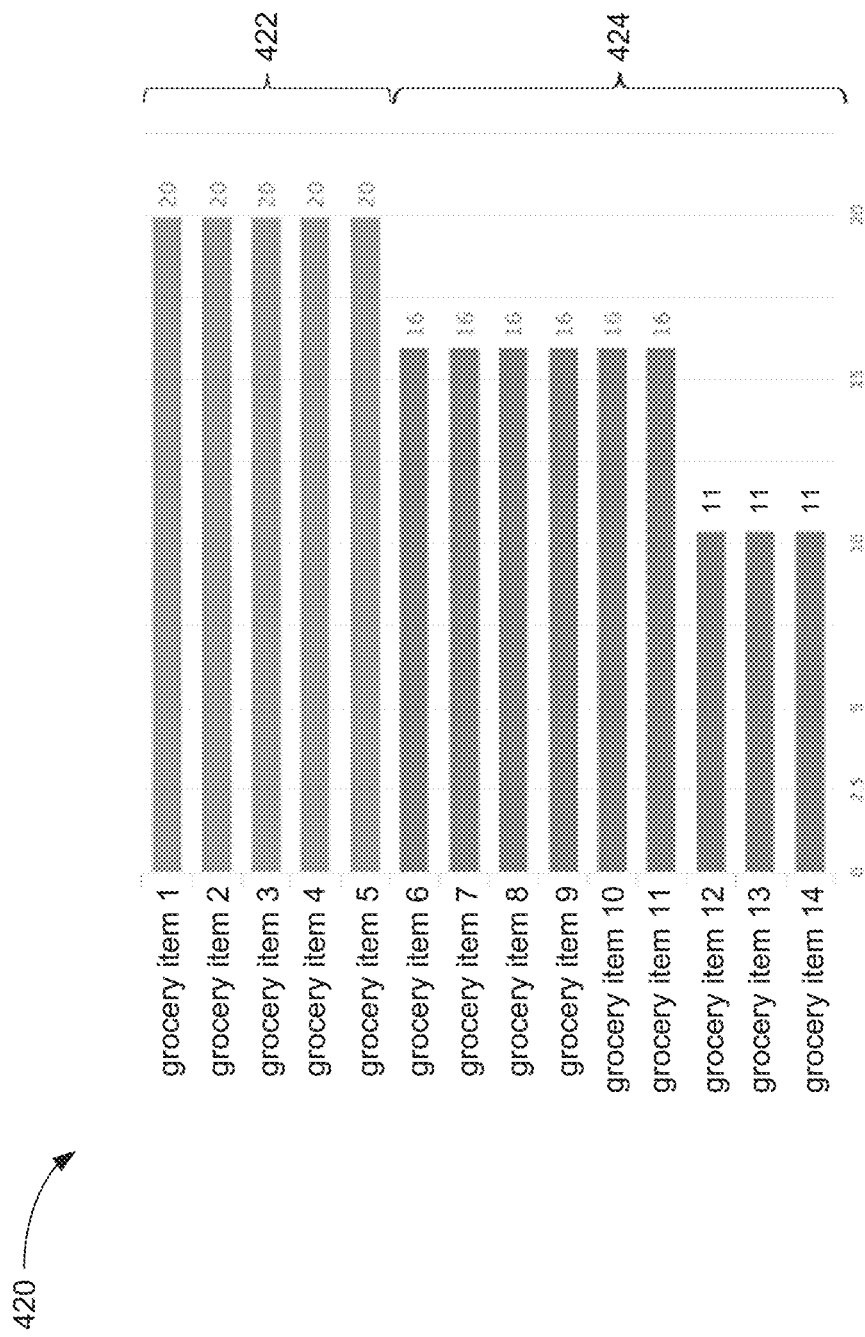
Figure 5A:
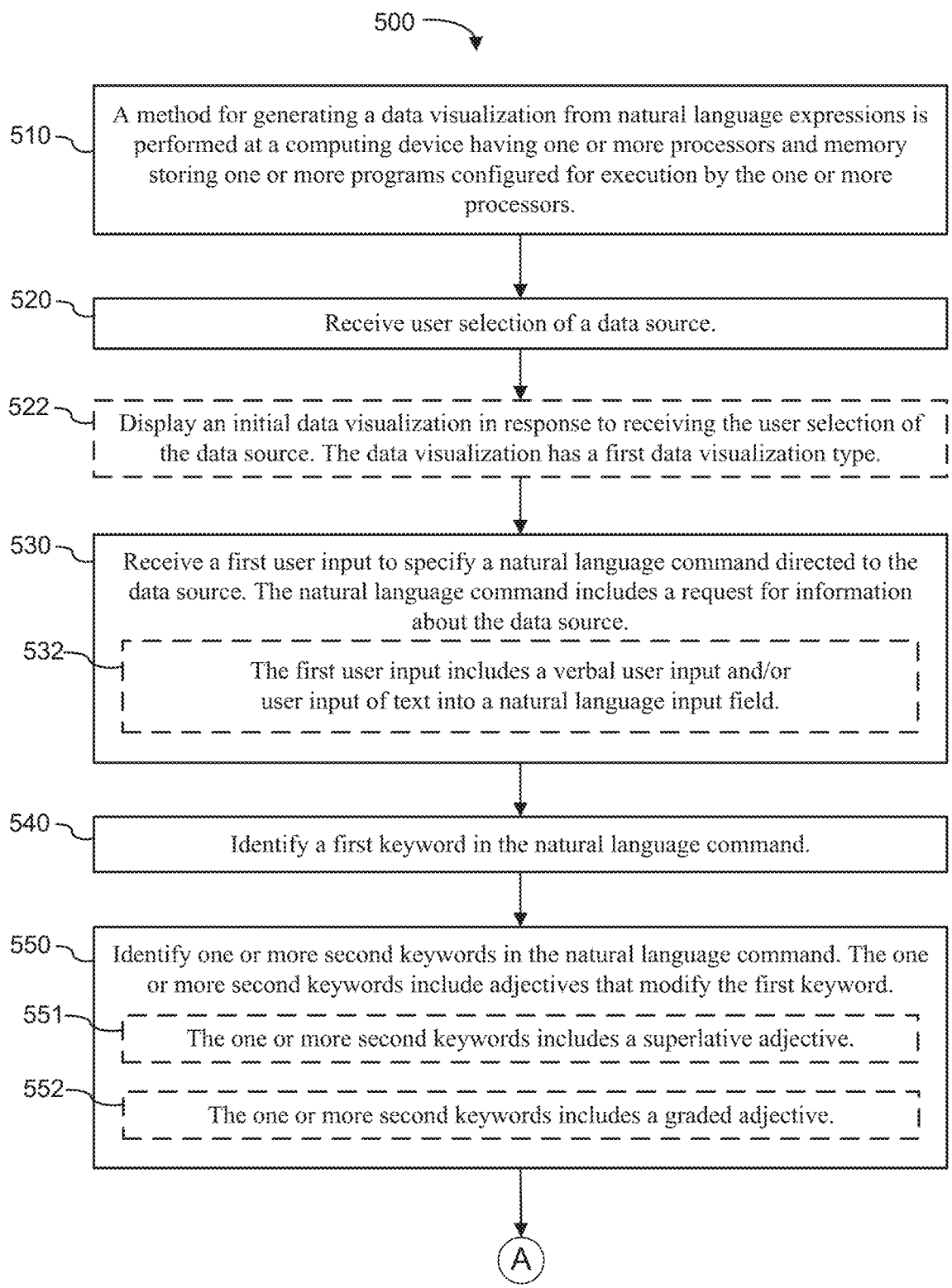
FIGS. 5A-5D provide a flow diagram of a method for generating data visualizations according to some implementations.
Figure 5B:
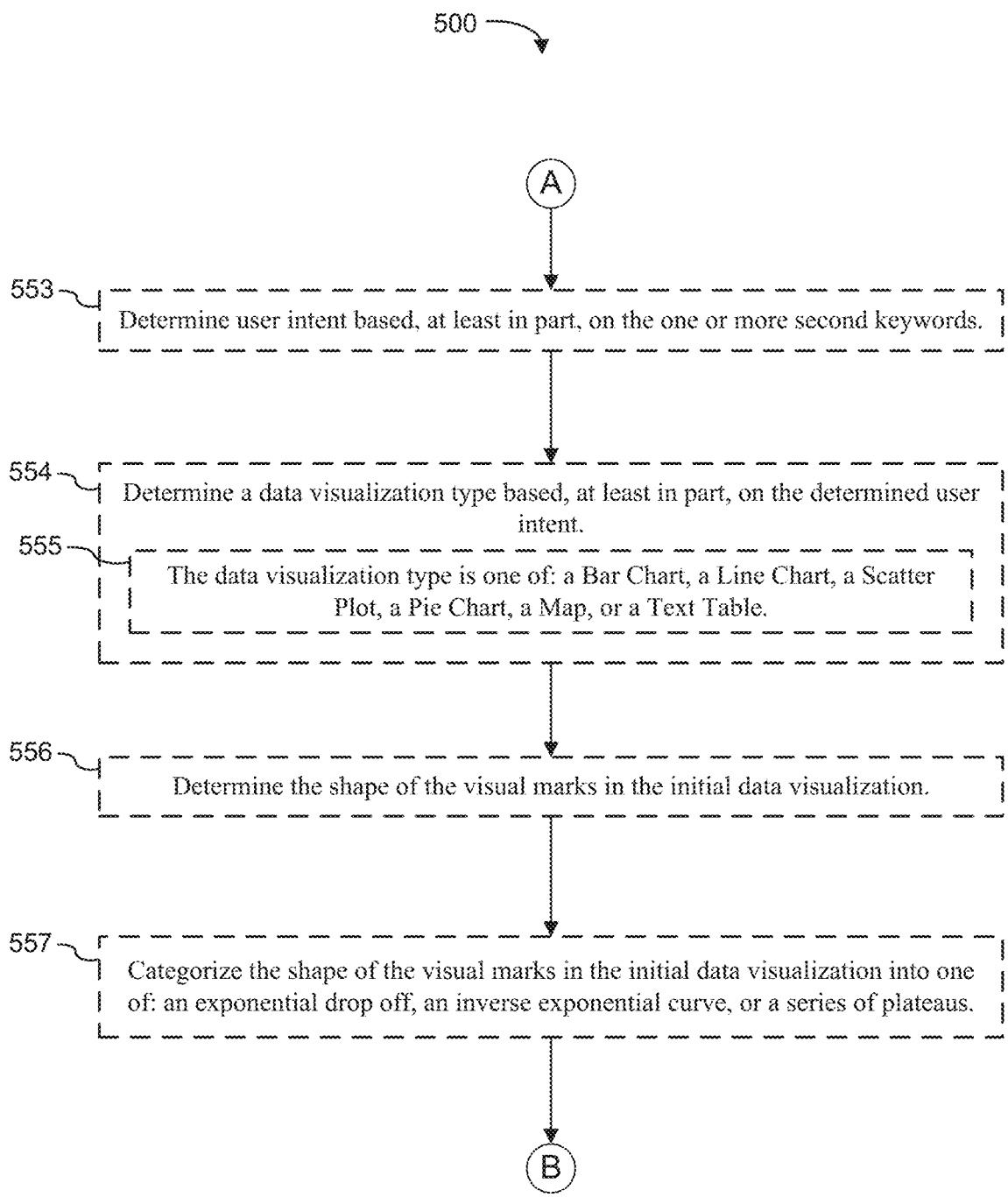
Figure 5C:
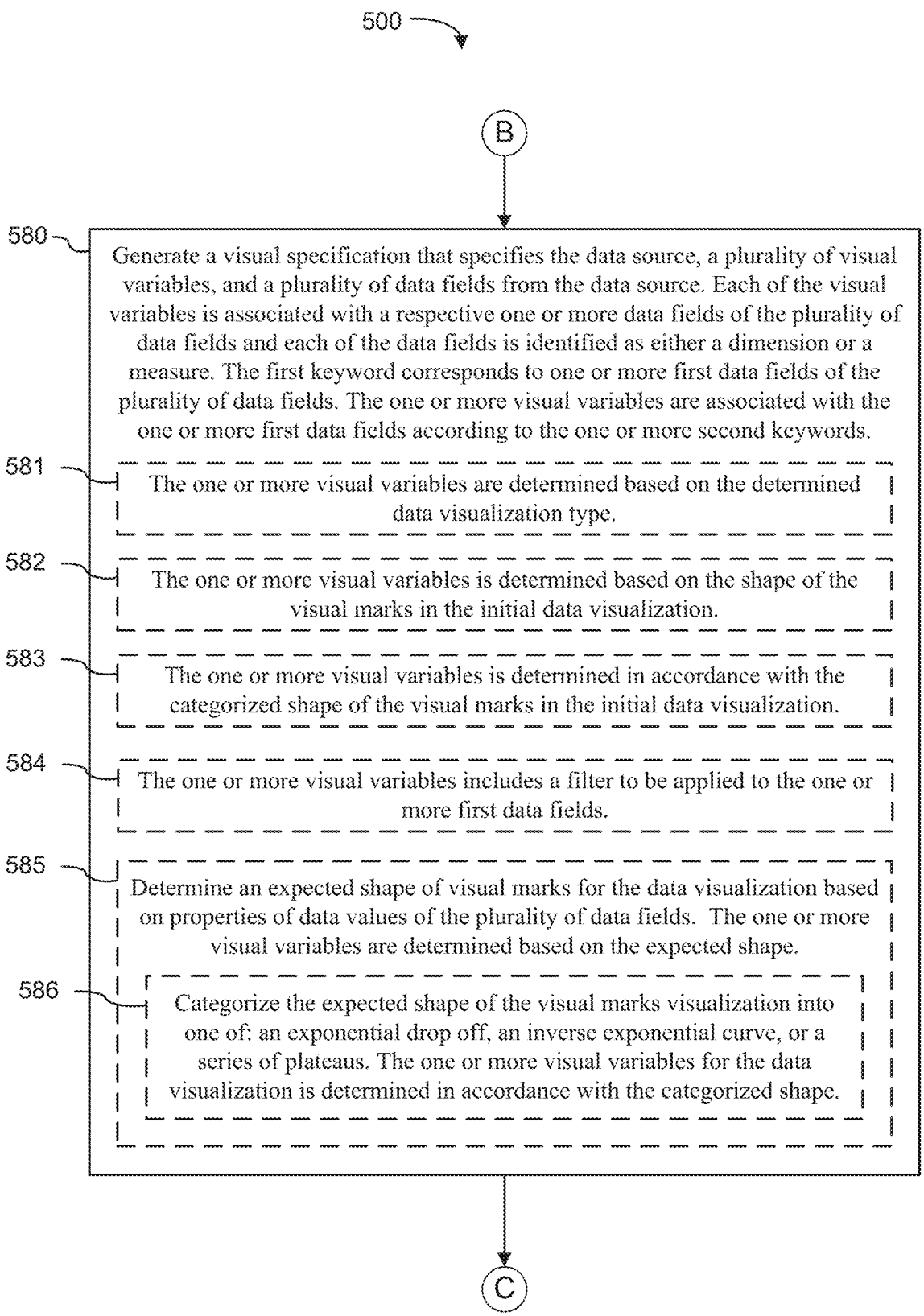
Figure 5D:
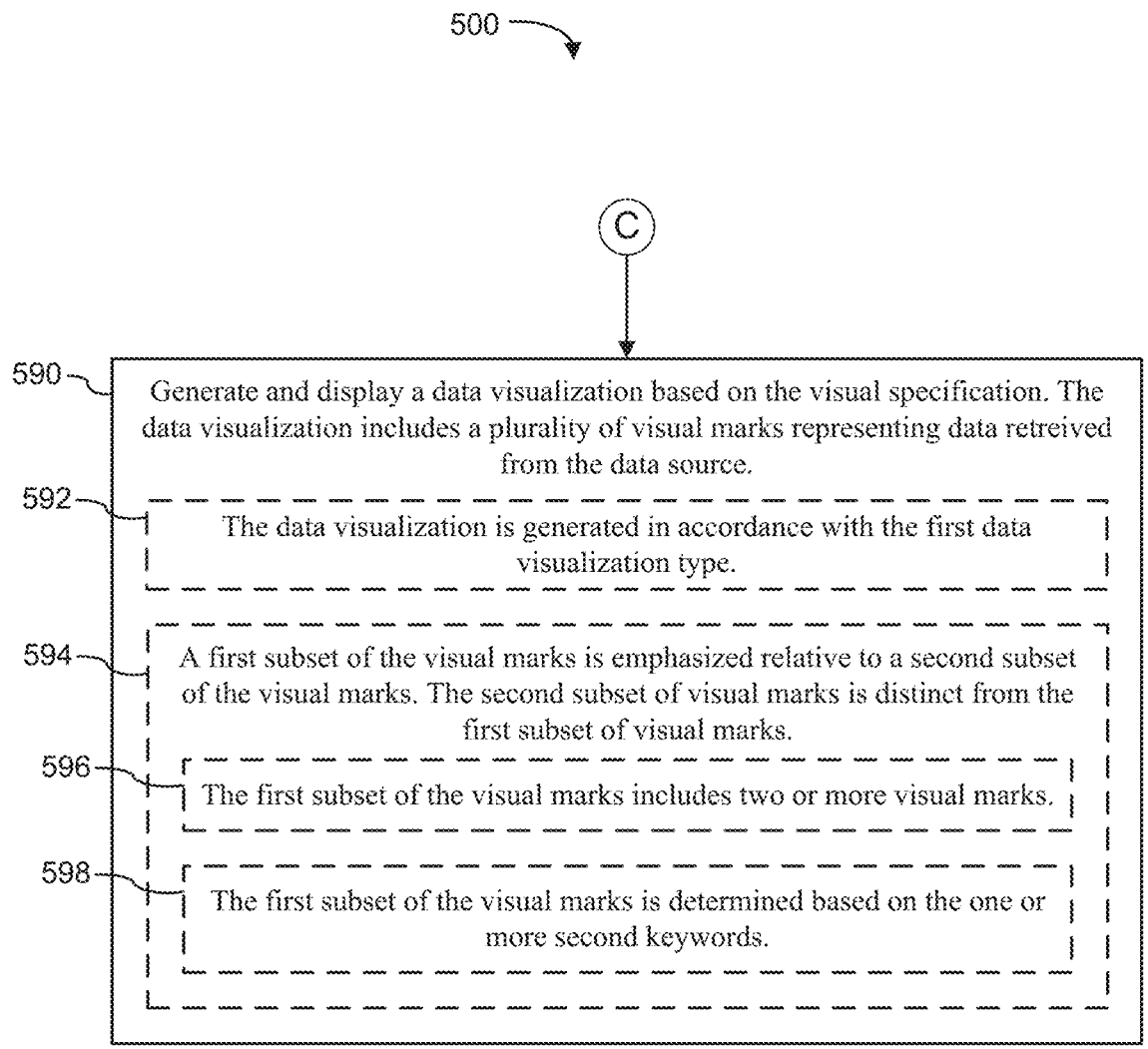

FIGS. 4A-4C provide examples of emphasized visual marks in a data visualization based on the shape of the visual marks in accordance with some implementations. Data visualizations 400, 410, and 420 illustrate bar graphs showing the price of grocery items purchased this month. The visual marks displayed in each of the data visualizations 400, 410, and 420 have a different shape to one another and thus, are categorized into different shape categories.

Referring to FIG. 4A, the visual marks (the bars) in the data visualization 400 can be categorized as having a shape that resembles an exponential drop off. Each subsequent bar is roughly 38% smaller than the previous bar resulting in a "stair step" shape. In response to a natural language command that asks "which of my grocery expenses is the highest this month," or "which of my grocery expenses are highest this month," or "which of my grocery expenses are high this month," the data visualization 400 displays visual marks (bars) corresponding to the three most expensive grocery items in a different color relative to the rest of the visual marks that correspond to all other grocery items. A first subset 402 of the visual marks corresponding to three most expensive grocery items is emphasized (e.g., highlighted or shown in a different color) relative to a second subset 404 of the visual marks that correspond to all other grocery items (e.g., the second subset 404 of the visual marks is deemphasized by showing them in a different color or shade compared to the first subset 402 of the visual marks).

Referring to FIG. 4B, the visual marks (the bars) in the data visualization 410 can be categorized as having a shape that resembles an inverse exponential curve. In response to a natural language command, such as "which of my grocery expenses is the highest this month," "which of my grocery expenses are highest this month," or "which of my grocery expenses are high this month," the data visualization 410 displays visual marks (bars) corresponding to the top five most expensive grocery items in a different color relative to the rest of the visual marks. A first subset 412 of the visual marks corresponding to the top five most expensive grocery items is emphasized (e.g., highlighted or shown in a different color) relative to a second subset 414 of the visual marks that correspond to all other grocery items.

Referring to FIG. 4C, the visual marks (the bars) in the data visualization 420 can be categorized as having a shape that resembles a series of plateaus in that a first plateau of items is followed by roughly a 20% drop to a second plateau of items, followed by a 35% drop. In response to a natural language command, such as "which of my grocery expenses is the highest this month," "which of my grocery expenses are highest this month," or "which of my grocery expenses are high this month," the data visualization 420 displays visual marks (bars) corresponding to the first plateau (in this case, the top five most expensive grocery items) in a different color relative to the rest of the visual marks in the second and third plateaus (that correspond to the rest of the grocery items). A first subset 422 of the visual marks that belong in the first plateau is emphasized (e.g., highlighted or shown in a different color) relative to a second subset 424 of the visual marks (in the second and third plateaus).

As illustrated in FIGS. 4A-4C, the number of visual marks designated as corresponding to the superlative adjective (e.g., "highest") can depend on the shape of the data.

FIGS. 5A-5D provide a flow diagram illustrating a method 500 of using natural language for generating (510) a data visualization according to some implementations. The steps of the method 500 may be performed by a computer 200. In some implementations, the computer includes (510) one or more processors and memory. FIGS. 5A-5D correspond to instructions stored in a computer memory or computer-readable storage medium (e.g., the memory 206 of the computing device 200). The memory stores (510) one or more programs configured for execution by the one or more processors. For example, the operations of the method 500 are performed, at least in part, by a data visualization generation module 234 and/or a language processing module 238.

In accordance with some implementations, the computer receives (520) user selection of a data source and receives (530) a first user input to specify a natural language command that is directed to the data source. The natural language command includes (530) a request for information about the data source. In some instances, the user input is received (532) as text input (e.g., a via keyboard 216 or via touch sensitive display 214) from a user in a natural language input field 124 a graphical user interface 100 of a data visualization application 230. In some instances, the user input is received (532) as a verbal user input (e.g., a voice command) using a microphone 220 coupled to the computer. In response to receiving the first user input, the computer identifies (540) a first keyword in the natural language command and identifies (550) one or more second keywords in the natural language command. The one or more second keywords include (550) adjective(s) that modify the first keyword. In some instances, the one or more second keywords includes (551) a superlative adjective and/or includes (552) a graded adjective.

The computer then generates (580) a visual specification that specifies the data source, a plurality of visual variables, and a plurality of data fields from the data source. Each of the visual variables is associated (580) with a respective one or more data fields of the plurality of data fields and each of the data fields is identified (580) as either a dimension or a measure. The first keyword corresponds (580) to one or more first data fields of the plurality of data fields and the one or more visual variables are associated (580) with the one or more first data fields according to the one or more second keywords. The computer generates (590) a data visualization based on the visual specification and displays (590) the data visualization in a data visualization region 112 of the graphical user interface 100. The data visualization includes (590) a plurality of visual marks that represent data retrieved from the data source.

In some implementations, a first subset of the visual marks is emphasized (594) (e.g., highlighted or displayed in a different color) relative to a second subset of the visual marks. The second subset of visual marks is (594) distinct from the first subset of visual marks. Alternatively, the second subset of the visual marks is deemphasized (e.g., grayed or shaded) relative to the first subset of visual marks.

In some instances, the first subset of the visual marks includes (596) two or more visual marks. In some implementations, the first subset the visual marks is determined (598) based on the one or more second keywords.

In some implementations, the computer determines (553) user intent based, at least in part, on the one or more second keywords. In some implementations, the computer determines (554) a data visualization type based, at least in part, on the determined user intent. For instance, the visualization type may be (555) one of: a Bar Chart, a Line Chart, a Scatter Plot, a Pie Chart, a Map, or a Text Table. In some implementations, the one or more visual variables are determined (581) based on the determined data visualization type.

In some implementations, in response to receiving the user selection of the data source, the computer displays (522) an initial data visualization. The initial data visualization has a first data visualization type and includes visual marks, in the data visualization region 112 of the graphical user interface 100. In some implementations, the data visualization is generated (592) in Accordance with the first data visualization type.

An example of an initial data visualization 310 is shown in FIG. 3A. For example, referring to FIG. 1, after selecting a data source, a user may associate one or more data fields from a schema information region 110 with one or more shelves (e.g., the column shelf 120 and the row shelf 122) in the data visualization region 112. In response to receiving the user associations, the computer retrieves data for the data fields from the dataset using a set of one or more queries and then displays a data visualization in the data visualization region 112 corresponding to the received user inputs. In another example, the initial data visualization may be generated and displayed in response to a natural language command that is provided by a user or as a default setting.

In some implementations, the computer (556) determines the shape of the visual marks in the initial data visualization 310. In some implementations, the computer categorizes (557) the shape of the visual marks in the initial data visualization into one of: (i) an exponential drop off, (ii) an inverse exponential curve, or (iii) a series of plateaus. Examples of these are shown in FIGS. 4A-4C. The one or more visual variables are determined (583) in accordance with (e.g., based on) the categorized shape of the visual marks in the initial data visualization.

In some implementations, the computer determines (582) the one or more visual variables based on the shape of visual marks in the initial data visualization.

In some implementations, the computer determines (585) the expected shape of the visual marks based on statistical properties of data values of data fields in the data source and the one or more visual variables are determined (585) based on the expected shape of the visual marks. In some implementations, the computer categorizes (586) the expected shape of the visual marks into one of: (i) an exponential drop off, (ii) an inverse exponential curve, or (iii) a series of plateaus. The one or more visual variables are determined (586) in accordance with (e.g., based on) the categorized expected shape.

In some implementations, the one or more visual variables includes (584) a filter to be applied to the one or more first data fields, as illustrated in FIGS. 4B and 4C.

Each of the above identified executable modules, applications, or sets of procedures may be stored in one or more of the identified memory devices, and corresponds to a set of instructions for performing a function described above. The modules or programs (i.e., sets of instructions) need not be implemented as separate software programs, procedures, or modules, and thus various subsets of these modules may be combined or otherwise re-arranged in various implementations. In some implementations, the memory 206 and/or 264 stores a subset of the modules and data structures identified above. Furthermore, the memory 206 and/or 264 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating data visualizations from natural language expressions, comprising:
at a computing device having a display, one or more processors, and memory storing one or more programs configured for execution by the one or more processors:
receiving a user input to specify a natural language command directed to a data source;
identifying a first keyword in the natural language command, the first keyword corresponding to a first data field from the data source;
identifying a second keyword in the natural language command, the second keyword comprising an adjective that provides context for the first data field;
generating a visual specification based on the first and second keywords, wherein:
the visual specification specifies the data source, a plurality of visual variables, and a plurality of data fields from the data source, including the first data field; and
the visual variables include a first visual variable that specifies filtering of the first data field according to the second keyword; and
generating and displaying a data visualization based on the visual specification, including displaying a plurality of visual marks representing data, retrieved from the data source, for the first data field.

2. The method of claim 1, wherein generating and displaying the data visualization includes retrieving data for the first data field that is filtered according to the first visual variable.

3. The method of claim 1, further comprising:
determining a user intent based at least in part on the second keyword.

4. The method of claim 1, further comprising:
determining a data visualization type for the data visualization based at least in part on the second keyword.

5. The method of claim 4, wherein the data visualization type is selected from the group consisting of Bar Chart, Line Chart, Scatter Plot, Pie Chart, Map, and Text Table.

6. The method of claim 4, wherein one or more visual variables of the plurality of visual variables are further determined based on the determined data visualization type.

7. The method of claim 4, wherein the data visualization is generated in accordance with the determined data visualization type.

8. The method of claim 1, further comprising:
categorizing a shape of the visual marks in the data visualization into one of: (i) an exponential drop off, (ii) an inverse exponential curve, or (iii) a series of plateaus, wherein one or more of the visual variables for the data visualization is determined in accordance with the categorized shape.

9. The method of claim 1, further comprising:
determining an expected overall shape of the visual marks in the data visualization based on properties of data values of the one or more data fields, wherein one or more of the visual variables are determined based on the expected overall shape of the visual marks.

10. The method of claim 9, further comprising:
categorizing an expected overall shape of the visual marks in the data visualization into one of: (i) an exponential drop off, (ii) an inverse exponential curve, or (iii) a series of plateaus, wherein the one or more visual variables for the data visualization is determined in accordance with the categorized shape.

11. The method of claim 9, wherein the one or more visual variables are determined based on the expected overall shape of the visual marks in the data visualization.

12. The method of claim 1, wherein a first subset of the plurality of visual marks is emphasized relative to a second subset of the visual marks, distinct from the first subset of the visual marks.

13. The method of claim 12, wherein the first subset of the plurality of visual marks includes two or more visual marks.

14. The method of claim 13, wherein the first subset of the plurality of visual marks is determined based on the second keyword.

15. The method of claim 1, wherein the adjective includes a superlative adjective.

16. The method of claim 1, wherein the adjective includes a graded adjective.

17. The method of claim 1, wherein each of the plurality of visual variables is associated with a respective one or more data fields of the plurality of data fields.

18. The method of claim 1, wherein the user input includes verbal user input and/or user input of text into a natural language input field.

19. A computing device, comprising:
one or more processors;
memory coupled to the one or more processors;
a display; and
one or more programs stored in the memory and configured for execution by the one or more processors, the one or more programs comprising instructions for:
receiving a user input to specify a natural language command directed to a data source;

identifying a first keyword in the natural language command, the first keyword corresponding to a first data field from the data source;
identifying a second keyword in the natural language command, the second keyword comprising an adjective that provides context for the first data field;
generating a visual specification based on the first and second keywords, wherein:
   the visual specification specifies the data source, a plurality of visual variables, and a plurality of data fields from the data source, including the first data field; and
   the visual variables include a first visual variable that specifies filtering of the first data field according to the second keyword; and
generating and displaying a data visualization based on the visual specification, including displaying a plurality of visual marks representing data, retrieved from the data source, for the first data field.

20. A non-transitory computer readable storage medium storing one or more programs, the one or more programs configured for execution by a computing device having one or more processors, memory, and a display, the one or more programs comprising instructions for:

receiving a user input to specify a natural language command directed to a data source;
identifying a first keyword in the natural language command, the first keyword corresponding to a first data field from the data source;
identifying a second keyword in the natural language command, the second keyword comprising an adjective that provides context for the first data field;
generating a visual specification based on the first and second keywords, wherein:
   the visual specification specifies the data source, a plurality of visual variables, and a plurality of data fields from the data source, including the first data field; and
   the visual variables include a first visual variable that specifies filtering of the first data field according to the second keyword; and
generating and displaying a data visualization based on the visual specification, including displaying a plurality of visual marks representing data, retrieved from the data source, for the first data field.

\* \* \* \* \*